(12) United States Patent
Burns et al.

(10) Patent No.: US 12,242,668 B2
(45) Date of Patent: Mar. 4, 2025

(54) MULTI-FINGER GESTURE BASED ON FINGER MANIPULATION DATA AND EXTREMITY TRACKING DATA

(71) Applicant: Apple Inc., Cupertino, CA (US)

(72) Inventors: Aaron M. Burns, Sunnyvale, CA (US); Adam G. Poulos, Saratoga, CA (US); Arun Rakesh Yoganandan, San Francisco, CA (US); Benjamin Hylak, San Francisco, CA (US); Benjamin R. Blachnitzky, San Francisco, CA (US); Nicolai Georg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/123,762

(22) Filed: Mar. 20, 2023

(65) Prior Publication Data
US 2023/0333651 A1    Oct. 19, 2023

Related U.S. Application Data

(63) Continuation of application No. PCT/US2021/049598, filed on Sep. 9, 2021.

(60) Provisional application No. 63/081,446, filed on Sep. 22, 2020.

(51) Int. Cl.
*G06F 3/01* (2006.01)
(52) U.S. Cl.
CPC ............. *G06F 3/014* (2013.01); *G06F 3/017* (2013.01)
(58) Field of Classification Search
CPC .................................. G06F 3/014; G06F 3/017
See application file for complete search history.

(56) References Cited

U.S. PATENT DOCUMENTS

| | | |
|---|---|---|
| 8,204,274 B2 | 6/2012 | Chen et al. |
| 9,448,635 B2 | 9/2016 | MacDougall et al. |
| 2015/0338916 A1* | 11/2015 | Priyantha ............... G06F 1/1698 345/173 |
| 2017/0351345 A1* | 12/2017 | Nirjon ....................... G06F 3/014 |
| 2018/0285636 A1* | 10/2018 | Fei ........................ G02B 27/017 |
| 2019/0265781 A1* | 8/2019 | Kehoe ..................... G06F 3/0304 |
| 2020/0026352 A1 | 1/2020 | Wang et al. |

(Continued)

OTHER PUBLICATIONS

Auraring: Precise Electromagnetic Finger Tracking Parizi et al. Dec. 2019 (Year: 2019).*

(Continued)

*Primary Examiner* — Sherrod L Keaton
(74) *Attorney, Agent, or Firm* — Fernando & Partners, LLP

(57) ABSTRACT

A method is performed at an electronic device with one or more processors, a non-transitory memory, a display, an extremity tracking system, and a communication interface provided to communicate with a finger-wearable device. The method includes displaying a computer-generated object on the display. The method includes obtaining finger manipulation data from the finger-wearable device via the communication interface. The method includes determining a multi-finger gesture based on extremity tracking data from the extremity tracking system and the finger manipulation data. The method includes registering an engagement event with respect to the computer-generated object according to the multi-finger gesture.

22 Claims, 16 Drawing Sheets

(56) References Cited

U.S. PATENT DOCUMENTS

2020/0105057 A1  4/2020  Horowitz et al.
2020/0142497 A1  5/2020  Zhu et al.

OTHER PUBLICATIONS

PCT International Search Report and Written Opinion dated Dec. 22, 2021, PCT International Application No. PCT/US2021/049598, pp. 1-12.

* cited by examiner

MULTI-FINGER GESTURE BASED ON FINGER MANIPULATION DATA AND EXTREMITY TRACKING DATA

CROSS-REFERENCE TO RELATED APPLICATIONS

This application is a continuation of Intl. Patent App. No. PCT/US2021/49598, filed on Sep. 9, 2021, which claims priority to U.S. Provisional Patent App. No. 63/081,446, filed on Sep. 22, 2020, which are incorporated by reference in their entirety.

TECHNICAL FIELD

The present disclosure relates to displaying a computer-generated object, and in particular registering an engagement event with respect to the computer-generated object.

BACKGROUND

In general, utilizing a current input modality in order to engage with a computer-generated object produces various inaccuracies associated with the engagement. For example, a physical object may obscure a portion of a computer-generated object, thereby reducing a tracking accuracy associated with a particular input modality. As another example, a computer-generated object that has a greater depth with respect to the display, such as a background computer-generated object, may be difficult for a user to engage with, thereby introducing further tracking inaccuracies.

SUMMARY

In accordance with some implementations, a method is performed at an electronic device with one or more processors, a non-transitory memory, a display, an extremity tracking system, and a communication interface provided to communicate with a finger-wearable device. The method includes displaying a computer-generated object on the display. The method includes obtaining finger manipulation data from the finger-wearable device via the communication interface. The method includes determining a multi-finger gesture based on extremity tracking data from the extremity tracking system and the finger manipulation data. The method includes registering an engagement event with respect to the computer-generated object according to the multi-finger gesture.

In accordance with some implementations, an electronic device includes one or more processors, a non-transitory memory, a display, an extremity tracking system, and a communication interface provided to communicate with a finger-wearable device. One or more programs are stored in the non-transitory memory and are configured to be executed by the one or more processors. The one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION OF IMPLEMENTATIONS

Figure 1:
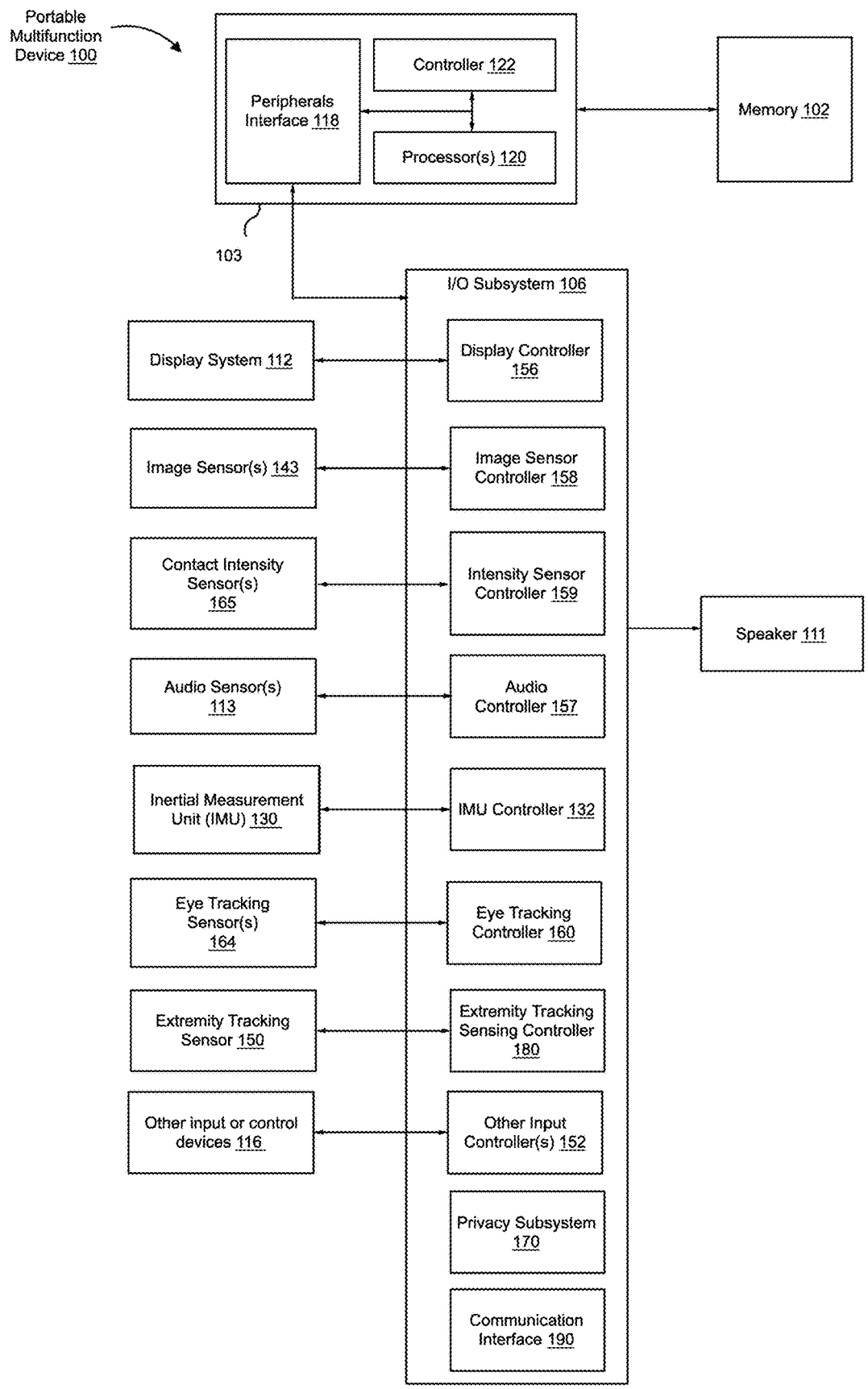
FIG. 1 is a block diagram of an example of a portable multifunction device in accordance with some implementations.

An electronic device, including an integrated input system, may enable user engagement with a computer-generated object based on an input from the integrated input system. For example, the integrated input system includes an extremity tracking input system and/or an eye tracking input system. As one example, based on an extremity tracking input from the extremity tracking input system, the electronic device determines a corresponding extremity of a user satisfies a proximity threshold with respect to a particular computer-generated object. Accordingly, the electronic device selects and/or manipulates the particular computer-generated object based on the extremity tracking input. However, utilizing an input from an integrated input system in order to engage with a computer-generated object introduces a number of issues. For example, when a physical object occludes (e.g., blocks) a portion of a user's extremity, the reliability of the extremity tracking input is correspondingly reduced. As another example, the limited mobility of a user's eyes and the unsteadiness of the user's extremity reduces the efficiency associated with manipulating a computer-generated object. As yet another example, a computer-generated object that has a relatively high depth with respect to the display, such as a computer-generated object located in a scene background, may be difficult for a user to engage with, thereby introducing extremity tracking and eye tracking inaccuracies.

By contrast, various implementations disclosed herein include methods, electronic devices, and systems for registering an engagement event with respect to a computer-generated object based on extremity tracking data and finger manipulation data. To that end, an electronic device includes an extremity tracking system to obtain the extremity tracking data, such as a computer-vision based system that performs extremity identification (e.g., semantic segmentation) with respect to image data. Further to that end, the electronic device includes a communication interface to obtain the finger manipulation data from a finger-wearable device. Based on the extremity tracking data and the finger manipulation data, the electronic device determines respective portions of a multi-finger gesture. For example, in some implementations, the multi-finger gesture corresponds to a gesture performed by multiple fingers of a single hand of a user, such as a pinch gesture (e.g., thumb movement plus index finger movement). As another example, in some implementations, the multi-finger gesture corresponds to a multi-handed gesture, such as a tap gesture performed by the finger-wearable device worn on a user's left hand (detected based on finger manipulation data), in combination with a drag gesture performed by the user's right hand (detected based on extremity tracking data). The electronic device registers an engagement event with respect to the computer-generated object according to the multi-finger gesture, such as selecting and/or manipulating the computer-generated object.

The finger-wearable device can be worn by a finger of a user. In some implementations, the electronic device tracks the finger with six degrees of freedom (6DOF) based on the finger manipulation data. Accordingly, even when a physical object occludes a portion of the finger-wearable device, the electronic device continues to receive finger manipulation data from the finger-wearable device. On the other hand, other devices that utilize extremity tracking cannot track an extremity of a user when a physical object occludes the extremity. Additionally, the electronic device enables object engagement (e.g., selection, manipulation, etc.) based on the finger manipulation data, independent of an apparent distance between the finger-wearable device and the content manipulation region, resulting in greater control and accuracy.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

Physical settings are those in the world where people can sense and/or interact without use of electronic systems. For example, a room is a physical setting that includes physical elements, such as, physical chairs, physical desks, physical lamps, and so forth. A person can sense and interact with these physical elements of the physical setting through direct touch, taste, sight, smell, and hearing.

In contrast to a physical setting, an extended reality (XR) setting refers to a computer-produced environment that is partially or entirely generated using computer-produced content. While a person can interact with the XR setting using various electronic systems, this interaction utilizes various electronic sensors to monitor the person's actions, and translates those actions into corresponding actions in the XR setting. For example, if a XR system detects that a person is looking upward, the XR system may change its graphics and audio output to present XR content in a manner consistent with the upward movement. XR settings may respect laws of physics to mimic physical settings.

Concepts of XR include virtual reality (VR) and augmented reality (AR). Concepts of XR also include mixed reality (MR), which is sometimes used to refer to the spectrum of realities from between physical settings (but not including physical settings) at one end and VR at the other end. Concepts of XR also include augmented virtuality (AV), in which a virtual or computer-produced setting integrates sensory inputs from a physical setting. These inputs may represent characteristics of a physical setting. For example, a virtual object may take on a color captured, using an image sensor, from the physical setting. Or, an AV setting may adopt current weather conditions of the physical setting.

Some electronic systems for implementing XR operate with an opaque display and one or more imaging sensors for capturing video and/or images of a physical setting. In some implementations, when a system captures images of a physical setting, and displays a representation of the physical setting on an opaque display using the captured images, the displayed images are called a video pass-through. Some electronic systems for implementing XR operate with a transparent or semi-transparent display (and optionally with one or more imaging sensors). Such a display allows a person to view a physical setting directly through the display, and also allows for virtual content to be added to the person's field of view by superimposing the content and over the physical setting. Some electronic systems for implementing XR operate with a projection system that projects virtual objects onto a physical setting. The projector may present a holograph onto a physical setting, or may project imagery onto a physical surface, or may project onto the eyes (e.g., retina) of a person, for example.

Electronic systems providing XR settings can have various form factors. A smart phone or tablet computer may incorporate imaging and display components to provide a XR setting. A head mount system may include imaging and display components to provide a XR setting. These systems may provide computing resources for providing XR settings, and may work in conjunction with one another to provide XR settings. For example, a smartphone or a tablet can connect with a head mounted display to provide XR settings. Or, a computer may connect with home entertainment components or vehicular systems to provide an on-window display or a heads-up display. Electronic systems providing XR settings may utilize display technologies such as LEDs, OLEDs, liquid crystal on silicon, a laser scanning light source, a digital light projector, or combinations thereof. Display technologies can employ substrates, through which light is transmitted, including light waveguides, holographic substrates, optical reflectors and combiners, or combinations thereof.

FIG. 1 is a block diagram of an example of a portable multifunction device 100 (sometimes also referred to herein as the "electronic device 100" for the sake of brevity) in accordance with some implementations. The electronic device 100 includes memory 102 (which optionally includes one or more computer readable storage mediums), a memory controller 122, one or more processing units (CPUs) 120, a peripherals interface 118, an input/output (I/O) subsystem 106, a speaker 111, a display system 112, an inertial measurement unit (IMU) 130, image sensor(s) 143 (e.g., camera), contact intensity sensor(s) 165, audio sensor(s) 113 (e.g., microphone), eye tracking sensor(s) 164 (e.g., included within a head-mountable device (HMD)), an extremity tracking sensor 150, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, an audio controller 157, an eye tracking controller 160, one or more input controllers 152 for other input or control devices, an IMU controller 132, an extremity tracking controller 180, a privacy subsystem 170, and a communication interface 190. The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include an up/down button for volume control of the speaker 111 and/or audio sensor(s) 113. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time of flight sensor that obtains depth information characterizing a particular object.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (collectively termed "graphics"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

In some implementations, the display system 112 corresponds to a touch-sensitive surface. For example, the display system 112 has a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

In some implementations, the user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The speaker 111 and the audio sensor(s) 113 provide an audio interface between a user and the electronic device 100. Audio circuitry receives audio data from the peripherals interface 118, converts the audio data to an electrical signal, and transmits the electrical signal to the speaker 111. The speaker 111 converts the electrical signal to human-audible sound waves. Audio circuitry also receives electrical signals converted by the audio sensors 113 (e.g., a microphone) from sound waves. Audio circuitry converts the electrical signal to audio data and transmits the audio data to the peripherals interface 118 for processing. Audio data is, optionally, retrieved from and/or transmitted to the memory 102 and/or RF circuitry by the peripherals interface 118. In some implementations, audio circuitry also includes a headset jack. The headset jack provides an interface between audio circuitry and removable audio input/output peripherals, such as output-only headphones or a headset with both output (e.g., a headphone for one or both ears) and input (e.g., a microphone).

The inertial measurement unit (IMU) 130 includes accelerometers, gyroscopes, and/or magnetometers in order measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

The eye tracking sensor(s) 164 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mountable device (HMD), a head-mountable enclosure, or within a heads-up display.

The extremity tracking sensor 150 obtains extremity tracking data indicative of a position of an extremity of a user. For example, in some implementations, the extremity tracking sensor 150 corresponds to a hand tracking sensor that obtains hand tracking data indicative of a position of a hand or a finger of a user within a particular object. In some implementations, the extremity tracking sensor 150 utilizes computer vision techniques to estimate the pose of the extremity based on camera images.

In various implementations, the electronic device 100 includes a privacy subsystem 170 that includes one or more privacy setting filters associated with user information, such as user information included in extremity tracking data, eye gaze data, and/or body position data associated with a user. In some implementations, the privacy subsystem 170 selectively prevents and/or limits the electronic device 100 or portions thereof from obtaining and/or transmitting the user information. To this end, the privacy subsystem 170 receives user preferences and/or selections from the user in response to prompting the user for the same. In some implementations, the privacy subsystem 170 prevents the electronic device 100 from obtaining and/or transmitting the user information unless and until the privacy subsystem 170 obtains informed consent from the user. In some implementations, the privacy subsystem 170 anonymizes (e.g., scrambles or obscures) certain types of user information. For example, the privacy subsystem 170 receives user inputs designating which types of user information the privacy subsystem 170 anonymizes. As another example, the privacy subsystem 170 anonymizes certain types of user information likely to include sensitive and/or identifying information, independent of user designation (e.g., automatically).

Figure 2:
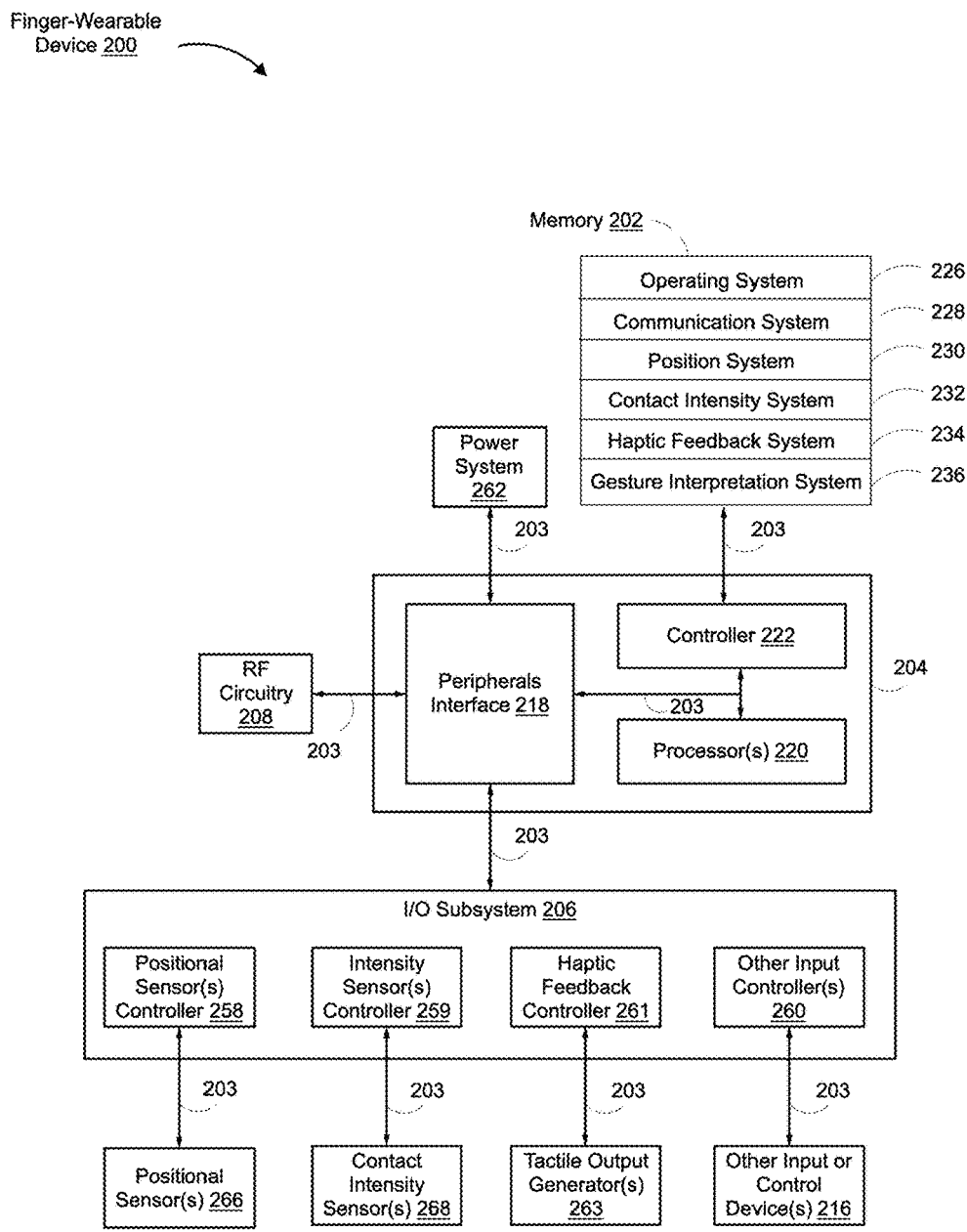
FIG. 2 is a block diagram of an example of a finger-wearable device in accordance with some implementations.

The electronic device 100 includes a communication interface 190 that is provided to communicate with a finger-wearable device, such as the finger-wearable device 200 illustrated in FIG. 2 or the finger-wearable device 320 in FIGS. 3A-3M. For example, the communication interface 190 corresponds to one of a BLUETOOTH interface, IEEE 802.11x interface, near field communication (NFC) interface, and/or the like. According to various implementations, the electronic device 100 obtains finger manipulation data from the finger-wearable device via the communication interface 190, as will be further described below.

FIG. 2 is a block diagram of an example of a finger-wearable device 200. The finger-wearable device 200 includes memory 202 (which optionally includes one or more computer readable storage mediums), memory controller 222, one or more processing units (CPUs) 220, peripherals interface 218, RF circuitry 208, and input/output (I/O) subsystem 206. These components optionally communicate over one or more communication buses or signal lines 203. One of ordinary skill in the art will appreciate that the finger-wearable device 200 illustrated in FIG. 2 is one example of a finger-wearable device, and that the finger-wearable device 200 optionally has more or fewer components than shown, optionally combines two or more components, or optionally has a different configuration or arrangement of the components. The various components shown in FIG. 2 are implemented in hardware, software, firmware, or a combination thereof, including one or more signal processing and/or application specific integrated circuits.

The finger-wearable device 200 includes a power system 262 for powering the various components. The power system 262 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

The memory 202 optionally includes high-speed random-access memory and optionally also includes non-volatile memory, such as one or more flash memory devices, or other non-volatile solid-state memory devices. Access to memory 202 by other components of the finger-wearable device 200, such as CPU(s) 220 and the peripherals interface 218, is, optionally, controlled by memory controller 222.

The peripherals interface 218 can be used to couple input and output peripherals of the finger-wearable device 200 to the CPU(s) 220 and the memory 202. The one or more processors 220 run or execute various software programs and/or sets of instructions stored in memory 202 to perform various functions for the finger-wearable device 200 and to process data.

In some implementations, the peripherals interface 218, the CPU(s) 220, and the memory controller 222 are, optionally, implemented on a single chip, such as chip 204. In some implementations, they are implemented on separate chips.

The RF (radio frequency) circuitry 208 receives and sends RF signals, also called electromagnetic signals. The RF circuitry 208 converts electrical signals to/from electromagnetic signals and communicates with the electronic device 100 or 310, communications networks, and/or other communications devices via the electromagnetic signals. The RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), BLUETOOTH, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

The I/O subsystem 206 couples input/output peripherals on the finger-wearable device 200, such as other input or control devices 216, with the peripherals interface 218. The I/O subsystem 206 optionally includes one or more positional sensor controllers 258, one or more intensity sensor controllers 259, a haptic feedback controller 261, and one or more other input controllers 260 for other input or control devices. The one or more other input controllers 260 receive/send electrical signals from/to other input or control devices 216. The other input or control devices 216 optionally include physical buttons (e.g., push buttons, rocker buttons, etc.), dials, slider switches, click wheels, and so forth. In some implementations, the other input controller(s) 260 are, optionally, coupled with any (or none) of the following: an infrared port and/or a USB port.

In some implementations, the finger-wearable device 200 includes one or more positional sensors 266 that output positional data associated with the finger-wearable device 200. The positional data is indicative of a position, orientation, or movement of the finger-wearable device 200, such as a rotational movement or translational movement of the finger-wearable device 200. For example, the positional sensor(s) 266 include an inertial measurement unit (IMU) that provides 3D rotational data, such as roll, pitch, and yaw information. To that end, the IMU may include a combination of an accelerometer, gyroscopes, and magnetometers. As another example, the positional sensor(s) 266 include a magnetic sensor that provides 3D positional data, such as the position of the finger-wearable device 200. For example, the magnetic sensor measures weak magnetic fields in order to determine a position of the finger-wearable device 200.

In some implementations, the finger-wearable device 200 includes one or more contact intensity sensors 268 for detecting intensity (e.g., force or pressure) of a contact of a finger, wearing the finger-wearable device 200, on a physical object. The one or more contact intensity sensors 268 output contact intensity data associated with the finger-wearable device 200. As one example, the contact intensity data is indicative of the force or pressure of a tap gesture associated with a finger, which is wearing the finger-wearable device 200, tapping on a surface of a physical table. The one or more contact intensity sensors 268 may include an interferometer. The one or more contact intensity sensors 268 may include one or more piezoresistive strain gauges, capacitive force sensors, electric force sensors, piezoelectric force sensors, optical force sensors, capacitive touch-sensitive surfaces, or other intensity sensors.

The finger-wearable device 200 optionally includes one or more tactile output generators 263 for generating tactile outputs on the finger-wearable device 200. In some implementations, the term "tactile output" refers to physical displacement of an accessory (e.g., the finger-wearable device 200) of an electronic device (e.g., the electronic device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of the finger-wearable device 200) is, optionally, interpreted by the user as a "click" of a physical actuator button. In some cases, a user will feel a tactile sensation such as a "click" even when there is no movement of a physical actuator button associated with the finger-wearable device that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the electronic device or a component thereof that will generate the described sensory perception for a typical (or average) user.

FIG. 2 shows the tactile output generator(s) 263 coupled with a haptic feedback controller 261. The tactile output generator(s) 263 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the electronic device). The tactile output generator(s) 263 receive tactile feedback generation instructions from a haptic feedback system 234 and generates tactile outputs on the finger-wearable device 200 that are capable of being sensed by a user of the finger-wearable device 200.

In some implementations, the software components stored in the memory 202 include an operating system 226, a communication system (or set of instructions) 228, a position system (or set of instructions) 230, a contact intensity system (or set of instructions) 232, a haptic feedback system (or set of instructions) 234, and a gesture interpretation system (or set of instructions) 236. Furthermore, in some implementations, the memory 202 stores device/global internal state associated with the finger-wearable device. The device/global internal state includes one or more of: sensor state, including information obtained from the finger wearable device's various sensors and other input or control devices 216: positional state, including information regarding the finger-wearable device's position (e.g., position, orientation, tilt, roll and/or distance) relative to an electronic device (e.g., the electronic device 100); and location information concerning the finger-wearable device's absolute position.

The operating system 226 includes various software components and/or drivers for controlling and managing general system tasks (e.g., memory management, power management, etc.) and facilitates communication between various hardware and software components.

The communication system 228 facilitates communication with other devices (e.g., the electronic device 100 or the electronic device 310), and also includes various software components (e.g., for handling data received by the RF circuitry 208) that are adapted for coupling directly to other devices or indirectly over a network (e.g., the Internet, wireless LAN, etc.).

The position system 230, in conjunction with positional data from the one or more positional sensor(s) 266, optionally detects positional information concerning the finger-wearable device 200. The position system 230 optionally includes software components for performing various operations related to detecting the position of the finger-wearable device 200 and detecting changes to the position of the finger-wearable device 200 in a particular frame of reference. In some implementations, the position system 230 detects the positional state of the finger-wearable device 200 relative to the electronic device and detects changes to the positional state of the finger-wearable device 200 relative to the electronic device. As noted above, in some implementations, the electronic device 100 or 310 determines the positional state of the finger-wearable device 200 relative to the electronic device and changes to the positional state of the finger-wearable device 200 using information from the position system 230.

The contact intensity system 232, in conjunction with contact intensity data from the one or more contact intensity sensor(s) 268, optionally detects contact intensity information associated with the finger-wearable device 200. The contact intensity system 232 includes software components for performing various operations related to detection of contact, such as detecting the intensity and/or duration of a contact between the finger-wearable device 200 and a desk surface. Determining movement of the point of contact, which is represented by a series of contact intensity data, optionally includes determining speed (magnitude), velocity (magnitude and direction), and/or an acceleration (a change in magnitude and/or direction) of the point of contact.

The haptic feedback system 234 includes various software components for generating instructions used by the tactile output generator(s) 263 to produce tactile outputs at one or more locations on finger-wearable device 200 in response to user interactions with the finger-wearable device 200.

The finger-wearable device 200 optionally includes a gesture interpretation system 236. The gesture interpretation system 236 coordinates with the position system 230 and/or the contact intensity system 232 in order to determine a gesture performed by the finger-wearable device. For example, the gesture includes one or more of: a pinch gesture, a pull gesture, a pinch and pull gesture, a rotational gesture, a tap gesture, and/or the like. In some implementations, the finger-wearable device 200 does not include a gesture interpretation system, and an electronic device or a system (e.g., a gesture interpretation system integrated within an electronic device) determines a gesture performed by the finger-wearable device 200 based on finger manipulation data from the finger-wearable device 200. In some implementations, a portion of the gesture determination is performed at the finger-wearable device 200, and a portion of the gesture determination is performed at an electronic device/system. In some implementations, the gesture interpretation system 236 determines a time duration associated with a gesture. In some implementations, the gesture interpretation system 236 determines a contact intensity associated with a gesture, such as an amount of pressure associated with a finger (wearing the finger-wearable device 200) tapping on a physical surface.

Each of the above identified modules and applications correspond to a set of executable instructions for performing one or more functions described above and the methods described in this application (e.g., the computer-implemented methods and other information processing methods described herein). These systems (i.e., sets of instructions) need not be implemented as separate software programs, procedures or modules, and thus various subsets of these modules are, optionally, combined or otherwise re-arranged in various embodiments. In some implementations, the memory 202 optionally stores a subset of the systems and data structures identified above. Furthermore, the memory 202 optionally stores additional systems and data structures not described above.

FIGS. 3A-3M are examples of an electronic device 310 registering engagement events with respect to a computer-generated object based on respective multi-finger gestures in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

Figure 3A:
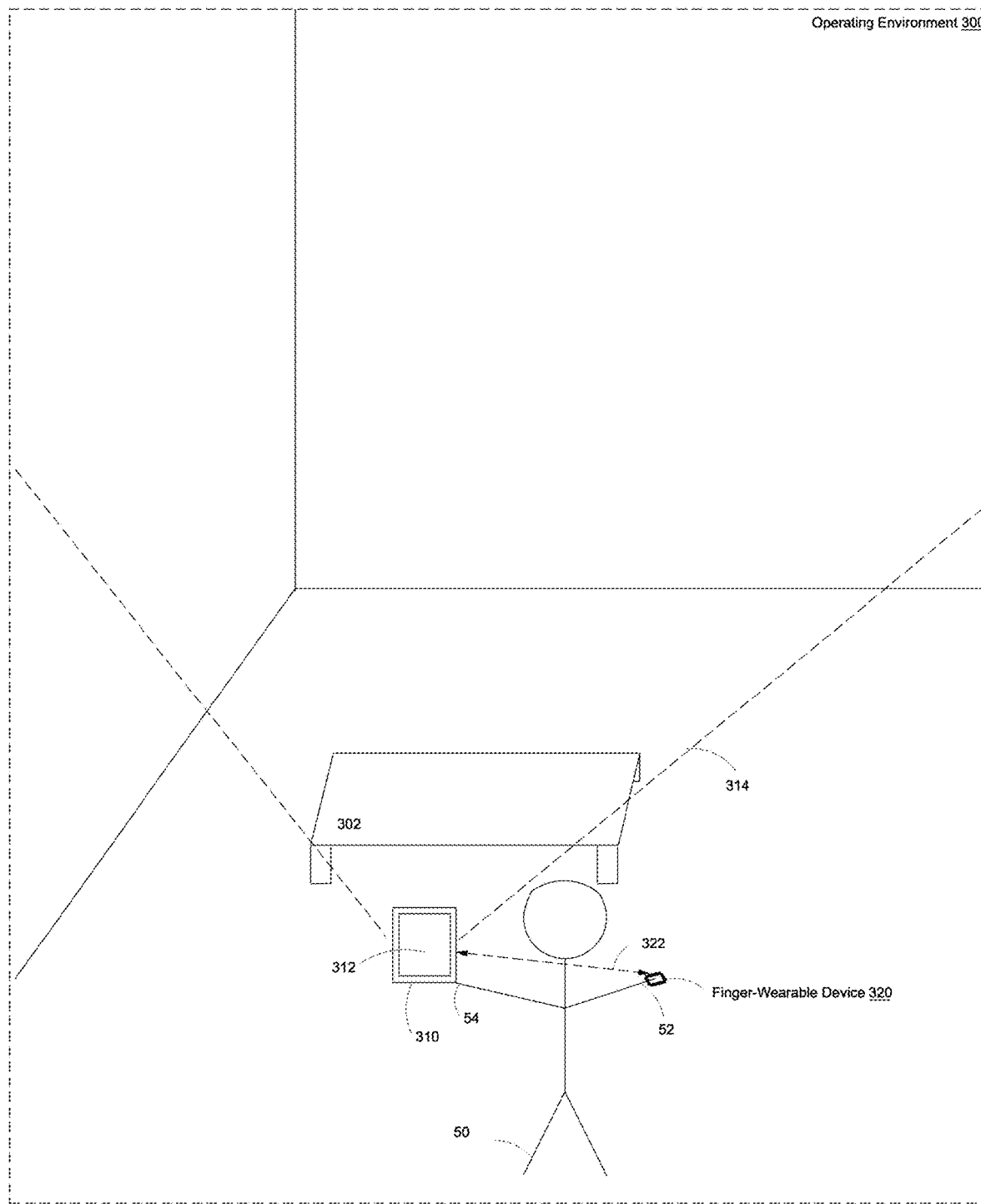
FIGS. 3A-3M are examples of an electronic device registering engagement events with respect to a computer-generated object based on respective multi-finger gestures in accordance with some implementations.

As illustrated in FIG. 3A, an electronic device 310 is associated with (e.g., operates according to) an operating environment 300. In some implementations, the electronic device 310 is similar to and adapted from the electronic device 100 in FIG. 1. In some implementations, the electronic device 310 generates one of the XR settings described above.

The electronic device 310 includes a display 312 that is associated with a viewable region 314 of the operating environment 300. For example, in some implementations, the electronic device 310 includes an image sensor associated with a field-of-view corresponding to the viewable region 314, and the electronic device 310 composites pass through image data from the image sensor with computer-generated content. As another example, in some implementations, the electronic device 310 includes a see-through display 312 that enables ambient light to enter from a portion of a physical environment that is associated with the viewable region 314. The operating environment 300 includes a physical table 302, and the viewable region 314 includes a portion of the physical table 302.

Figure 3B:
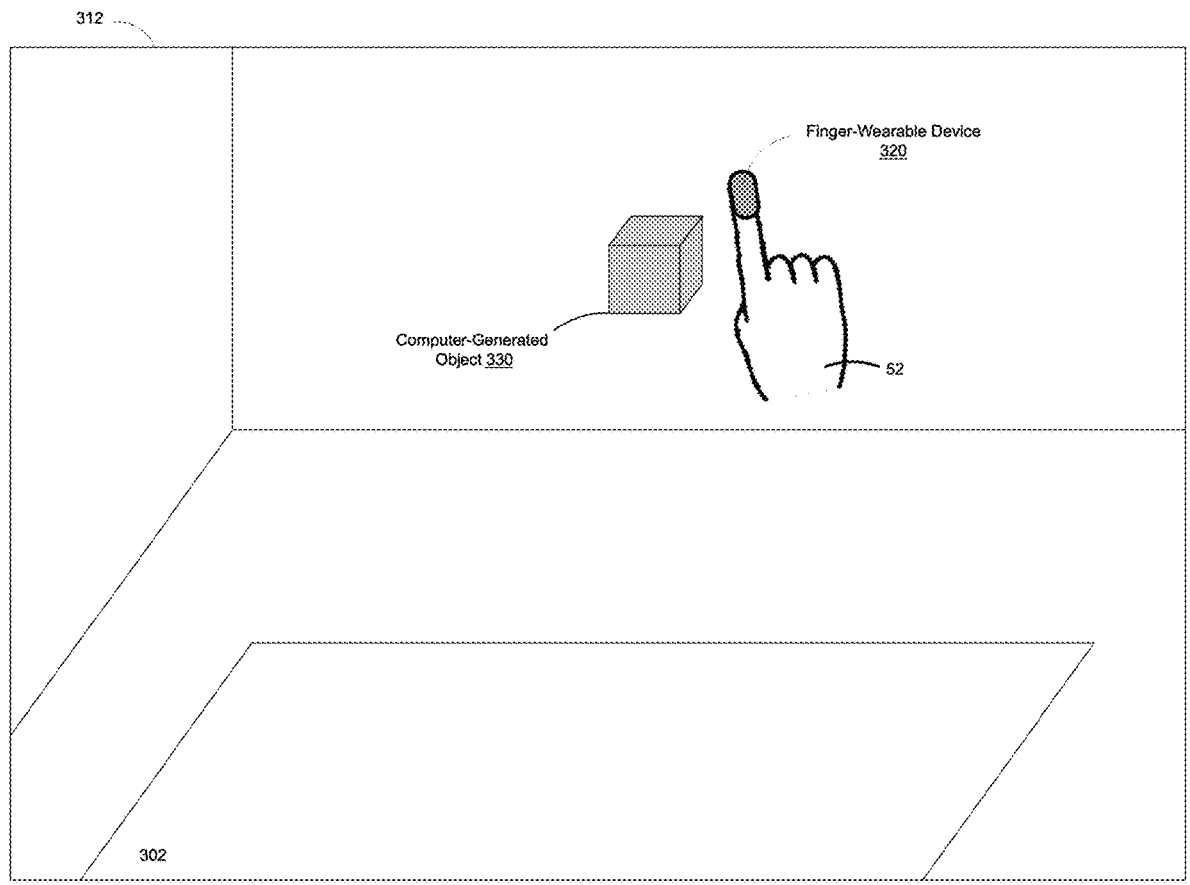

A finger-wearable device 320 can be worn on a finger of a first hand 52 of a user 50. For example, as illustrated in FIG. 3B, the finger-wearable device 320 is worn on the index finger of the first hand 52. In some implementations, the finger-wearable device 320 is similar to and adapted from the finger-wearable device 200 illustrated in FIG. 2.

In some implementations, the electronic device 310 includes a communication interface (e.g., the communication interface 190 in FIG. 1) that is provided to communicate with the finger-wearable device 320. The electronic device 310 establishes a communication link with the finger-wearable device 320, as is indicated by a communication link line 322. Establishing the link between the electronic device 310 and the finger-wearable device 320 is sometimes referred to as pairing or tethering. One of ordinary skill in the art will appreciate that the electronic device 310 may communicate with the finger-wearable device 320 according to a variety of communication protocols, such as BLUETOOTH, IEEE 802.11x, NFC, etc. The electronic device 310 obtains finger manipulation data from the finger-wearable device 320 via the communication interface. For example, the electronic device 310 obtains a combination of positional data (e.g., output by an IMU sensor and/or a magnetic sensor of the finger-wearable device 320) and contact intensity data (e.g., output by contact intensity sensor(s) of the finger-wearable device 320).

In some implementations, as illustrated in FIG. 3A, a second hand 54 of the user 50 is holding the electronic device 310. For example, in some implementations, the electronic device 310 corresponds to one of a smartphone, laptop, tablet, etc.

In some implementations, the electronic device 310 corresponds to a head-mountable device (HMD) that includes an integrated display (e.g., a built-in display) that displays a representation of the operating environment 300. In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure. In some implementations, the display of the device attached to the head-mountable enclosure presents (e.g., displays) the representation of the operating environment 300. For example, in some implementations, the electronic device 310 corresponds to a mobile phone that can be attached to the head-mountable enclosure.

In some implementations, the electronic device 310 includes an image sensor, such as a scene camera. For example, the image sensor obtains image data that characterizes the operating environment 300, and the electronic device 310 composites the image data with computer-generated content in order to generate display data for display on the display 312. The display data may be characterized by an XR environment. For example, the image sensor obtains image data that represents the portion of the physical table 302, and the generated display data, displayed on the display 312, includes a representation of the portion of the physical table 302 (See FIG. 3B).

In some implementations, the display 312 corresponds to a see-through display. The see-through display permits ambient light from the physical environment through the see-through display, and the representation of the physical environment is a function of the ambient light. For example, the see-through display is a translucent display, such as glasses with optical see-through. In some implementations, the see-through display is an additive display that enables optical see-through of the physical surface, such as an optical HMD (OHMD). For example, unlike purely compositing using a video stream, the additive display is capable of reflecting projected images off of the display while enabling the user to see through the display. In some implementations, the see-through display includes a photochromic lens. The HMD adds computer-generated objects to the ambient light entering the see-through display in order to enable display of the operating environment 300. For example, a see-through display permits ambient light from the operating environment 300 that includes the portion of the physical table 302, and thus the see-through display displays a representation of the portion of the physical table 302 (See FIG. 3B).

As illustrated in FIG. 3B, the electronic device 310 displays, on the display 312, a representation of the portion of the physical table 302 (hereinafter sometimes "the portion of the physical table 302" or the "physical table 302" for the sake of brevity). Moreover, the electronic device 310 displays, on the display 312, a computer-generated object 330 corresponding to a three-dimensional (3D) cube. The computer-generated object 330 may be associated with (e.g., representative of) a variety of content types, such as audio content, video content, image content, file content, textual content, metadata content, database content, and/or the like. Moreover, one or ordinary skill in the art will appreciate that, in some implementations, the computer-generated object 330 is a different object type, such as a different 3D object (e.g., a sphere) or a two-dimensional object (e.g., a tile).

The finger-wearable device 320, being worn by the index finger of the first hand 52, may move to within the viewable region 314. Accordingly, as illustrated in FIG. 3B, the electronic device 310 displays, on the display 312, respective representations of the first hand 52 and the finger-wearable device 320 (hereinafter sometimes "the first hand 52" and "the finger-wearable device 320" for the sake of brevity).

Figure 3C:
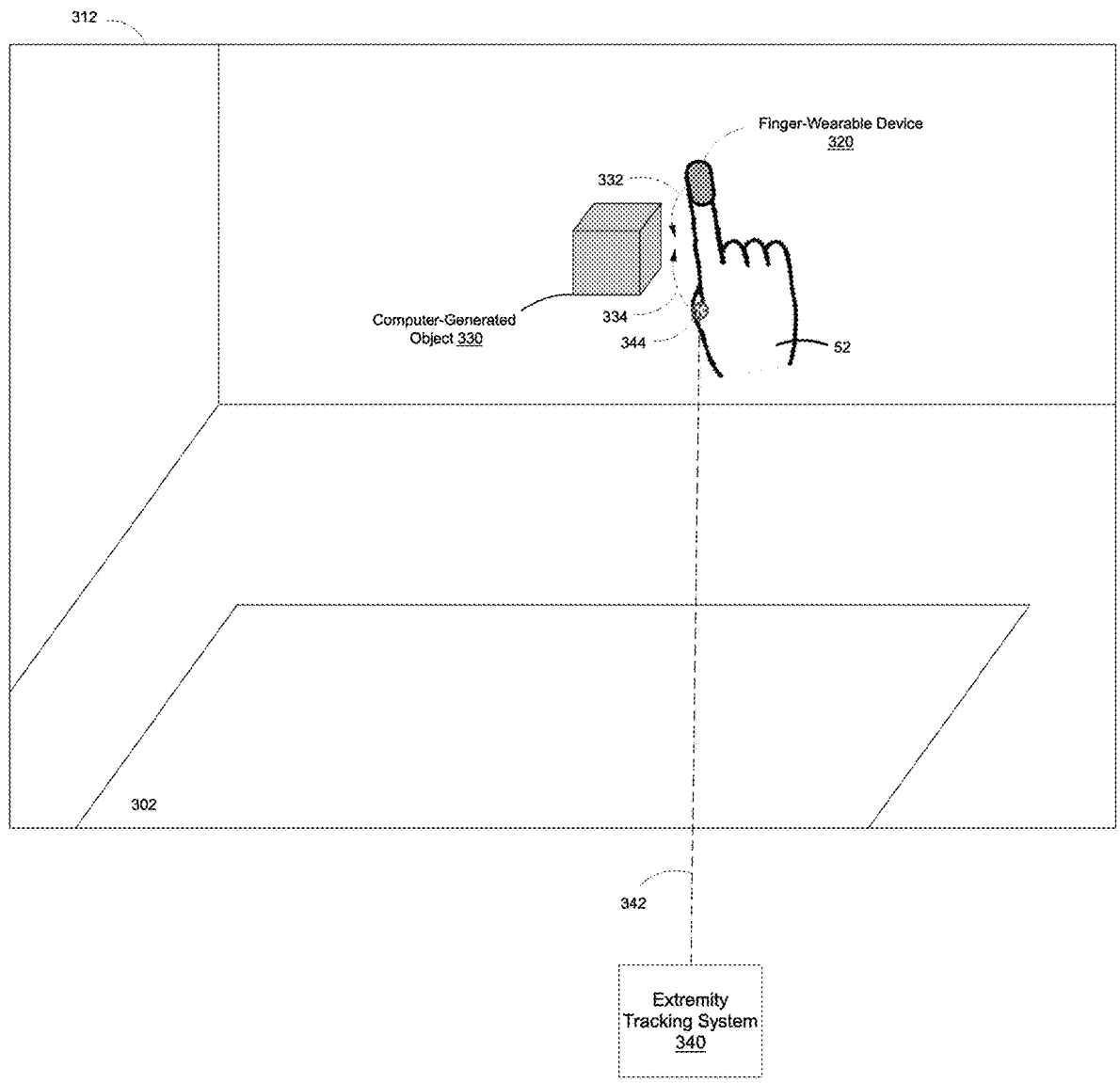
Figure 3D:
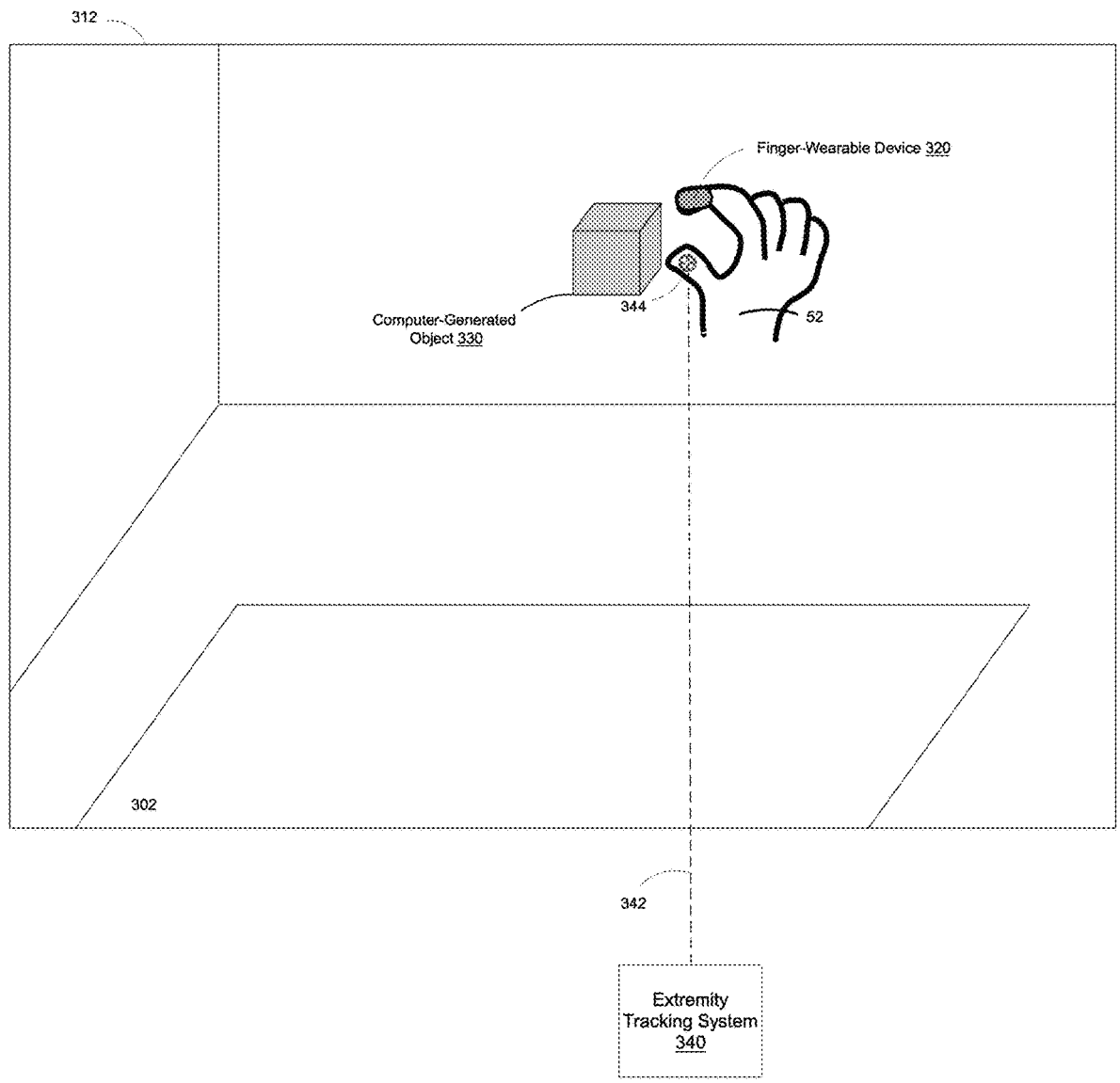

As illustrated in FIG. 3C, the finger-wearable device 320 and the thumb of the first hand 52 together begin performing a multi-finger pinch gesture. The multi-finger pinch gesture includes a first gesture associated with the thumb moving (e.g., upwards) towards the finger-wearable device 320. The first gesture is indicated by a first gesture line 334 in FIG. 3C (illustrated for purely explanatory purposes). Moreover, the multi-finger pinch gesture includes a second gesture associated with the finger-wearable device 320 moving (e.g., downwards) towards the thumb. The second gesture is indicated by a second gesture line 332 in FIG. 3C (illustrated for purely explanatory purposes).

The electronic device 310 obtains, via an extremity tracking system 340, extremity tracking data associated with the first gesture. In some implementations, the extremity tracking system 340 is integrated in the electronic device 310. Reception of the extremity tracking data is indicated by a tracking line 342 (illustrated for purely explanatory purposes). The extremity tracking data is indicative of positional values associated with the thumb. The positional values are indicated by a reticle 344 (illustrated for purely explanatory purposes). To that end, in some implementations, the extremity tracking system 340 performs a computer-vision technique in order to identify (e.g., track) the thumb. For example, the electronic device 310 obtains image data (e.g., via a forward-facing camera), and performs semantic segmentation (optionally with the aid of an integrated neural network) in order to identify the thumb represented within the image data.

In some circumstances, the thumb is partially obscured, as is illustrated in FIG. 3C. Accordingly, in some implementations, the extremity tracking system 340) identifies the first hand 52 as being a right hand, and estimates a position of the thumb based in part on an expected position of the thumb relative to the index finger of the right hand. Thus, in some implementations, the extremity tracking system 340 performs extremity tracking on multiple fingers (e.g., the thumb and the index finger)

In some implementations, the extremity tracking data indicates a plurality of positional values associated with an extremity at a respective plurality of times. For example, with reference to FIG. 3C, at a first time ($T_1$) before the thumb begins the first gesture, the extremity tracking data indicates a first positional value indicating that the thumb that is lower than the computer-generated object 330 on the display 312. Continuing with this example, with reference to FIG. 3D, at a second time ($T_2$) at which the thumb is performing the first gesture, the extremity tracking data indicates a second positional value indicating that the thumb is above a portion of the computer-generated object 330 on the display 312. Continuing with this example, with reference to FIG. 3E, at a third time ($T_3$) the extremity tracking data indicates a third positional value indicating that the thumb is at a higher position on the display 312 than the position of the thumb at the second time.

Moreover, the electronic device 310 obtains, from the finger-wearable device 320 via the communication interface, finger manipulation data associated with the second gesture. For example, with reference to FIGS. 3C and 3D, based on IMU data the electronic device 310 determines that the finger-wearable device 320 performs a rotational movement, and accordingly registers the start of the second gesture. As another example, with reference to FIGS. 3D and 3E, based on magnetic sensor data, the electronic device 310 determines that the finger-wearable device 320 moves downwards along a particular axis.

Based the extremity tracking data and the finger manipulation data, the electronic device 310 determines a multi-finger gesture. For example, with reference to FIGS. 3C-3E, the electronic device 310 determines the multi-finger pinch gesture. In some implementations, the electronic device 310 determines the multi-finger pinch gesture based on satisfaction of a proximity threshold. For example, based on the extremity tracking data, the electronic device 310 determines that the thumb moves from a first position in FIG. 3C to a second position in FIG. 3E. Continuing with this example, based on the finger manipulation data, the electronic device 310 determines that the finger-wearable device 320 moves from a third position in FIG. 3C to a fourth position in FIG. 3E. Continuing with this example, the electronic device 310 determines that the second position satisfies a proximity threshold with respect to the fourth position, and accordingly determines the multi-finger pinch gesture. In some implementations, the second position satisfies the proximity threshold with respect to the fourth position when the second position is less than a threshold distance from the fourth position.

Figure 3E:
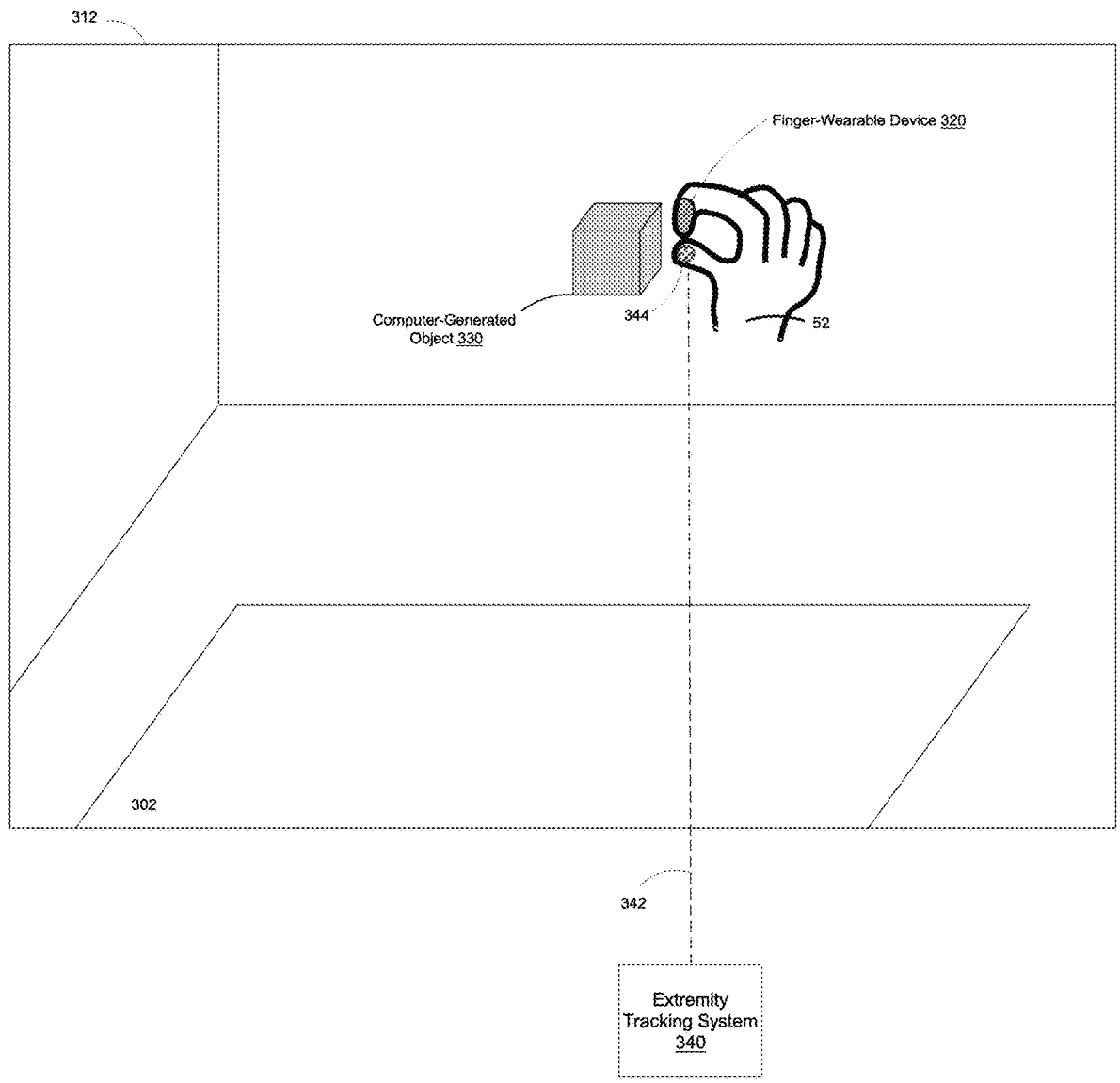
Figure 3F:
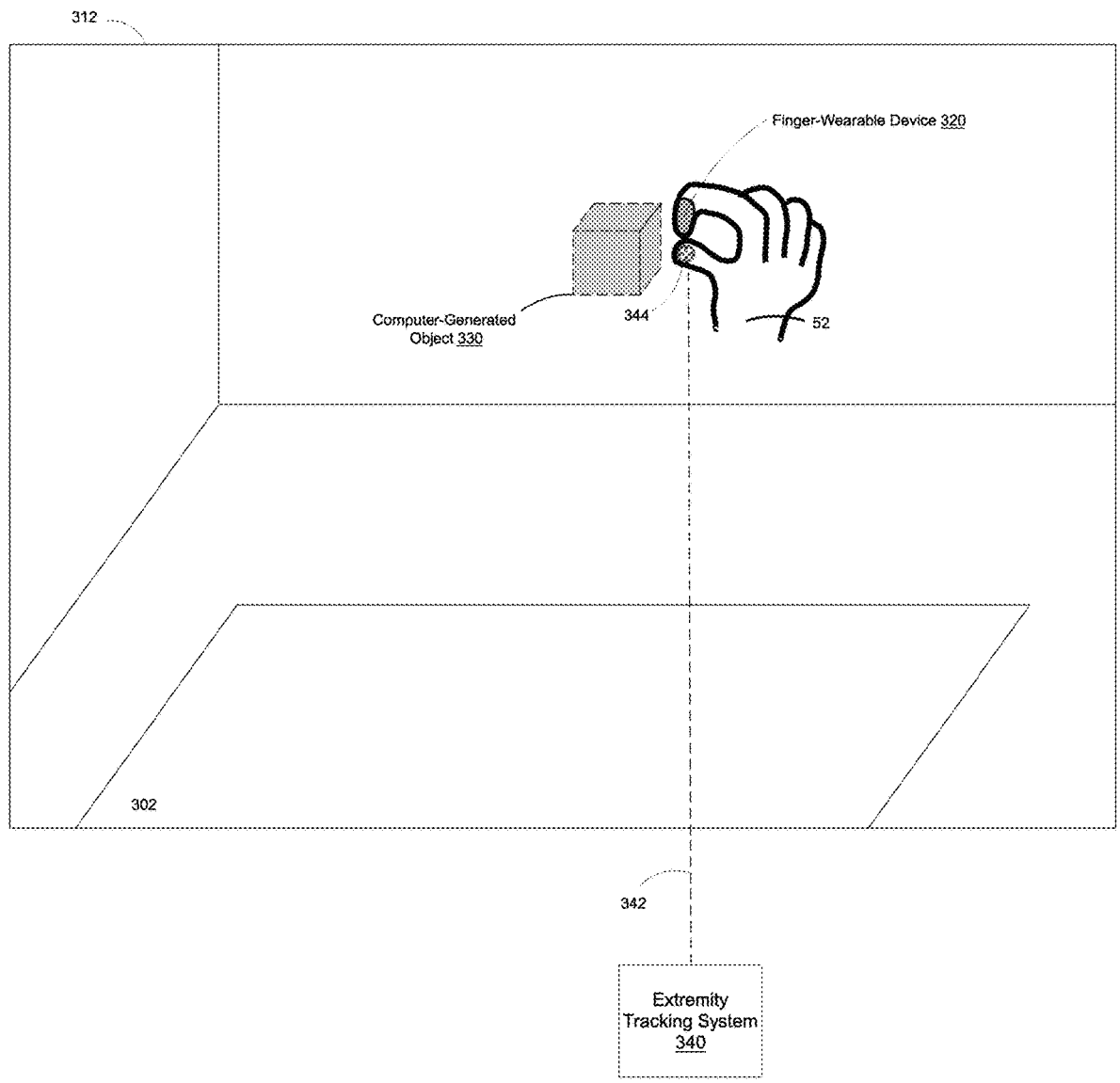

The electronic device 310 registers an engagement event with respect to the computer-generated object 330) according to the multi-finger gesture. For example, with reference to FIG. 3F, in response to determining the multi-finger pinch gesture, the electronic device 310 selects the computer-generated object 330. In some implementations, the electronic device 310 changes an appearance of the computer-generated object 330 in order to indicate the selection. For example, as illustrated in FIGS. 3E and 3F, the electronic device 310 changes the computer-generated object 330 from having solid line boundaries to dotted line boundaries. Displaying the indication of the selection provides feedback to the user 50, thereby reducing erroneous (e.g., unintended) inputs from the finger-wearable device 320, and reducing resource utilization by the electronic device 310 associated with processing finger manipulation data and extremity tracking data. In some implementations, selecting the computer-generated object 330 is in further response to determining that the multi-finger gesture satisfies a proximity threshold with respect to (e.g., is less than a threshold distance from) the computer-generated object 330. For example, when the display 312 includes multiple computer-generated objects, the electronic device 310 selects a particular computer-generated object that is nearest to a multi-finger pinch gesture upon completion of the multi-finger pinch gesture.

Figure 3G:
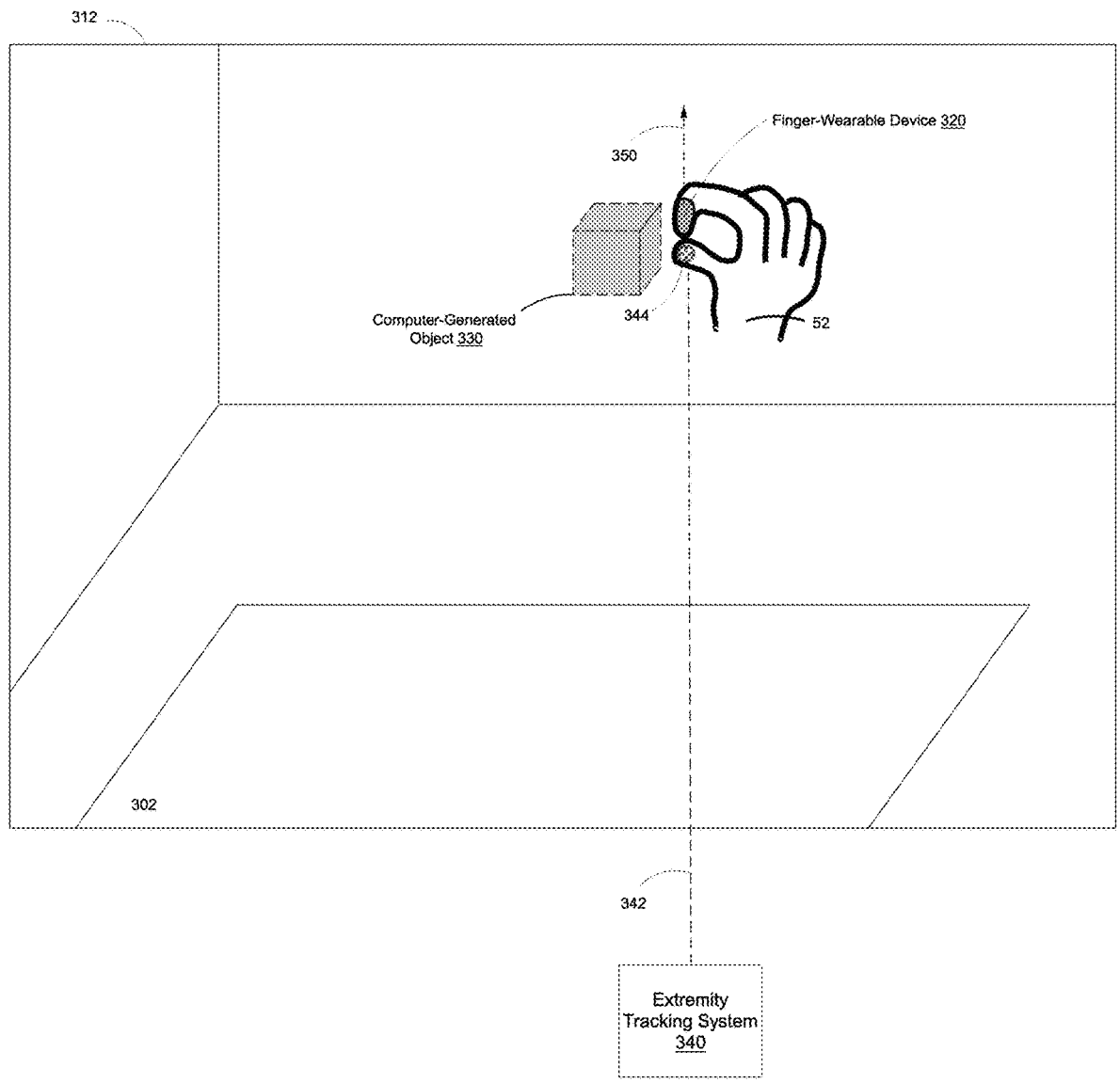
Figure 3H:
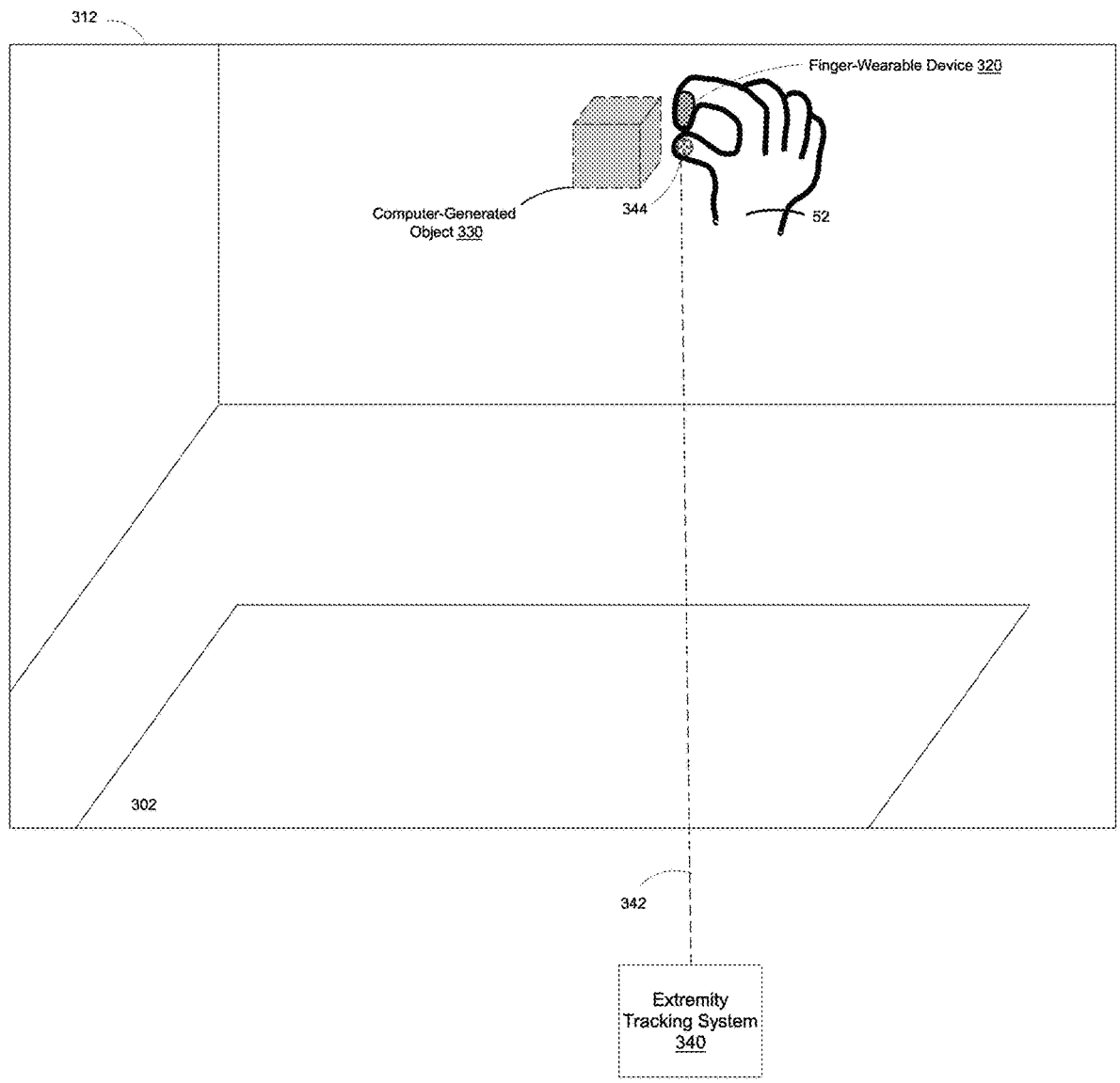

As another example, in some implementations, registering an engagement event includes manipulating the computer-generated object 330. For example, as illustrated in FIG. 3G, the electronic device 310 determines a multi-finger gesture corresponding to an upward movement by the first hand 52. The upward movement is indicated by a movement line 350 (illustrated for purely explanatory purposes). As the first hand 52 moves upwards, the electronic device 310 obtains extremity tracking data and finger manipulation data. Based on the extremity tracking data and the finger manipulation data, the electronic device 310 determines a multi-finger movement gesture and accordingly moves the computer-generated object 330 upwards, as illustrated in FIG. 3H.

Accordingly, in contrast to other devices, utilizing a multi-finger gesture that is a function of two distinct data sets (extremity tracking data and finger manipulation data) enables a more accurate and efficient engagement with a computer-generated object.

As illustrated in FIGS. 3I-3M, the electronic device 310 registers an engagement event with respect to the computer-generated object 330, based on a multi-handed multi-finger gesture. Utilizing single-handed multi-finger gestures (e.g., FIGS. 3C-3H) and multi-handed multi-finger gestures (e.g., FIGS. 3I-3M) in order to engage with a computer-generated object provides greater control to the user 50, resulting in an improved user experience.

Figure 3I:
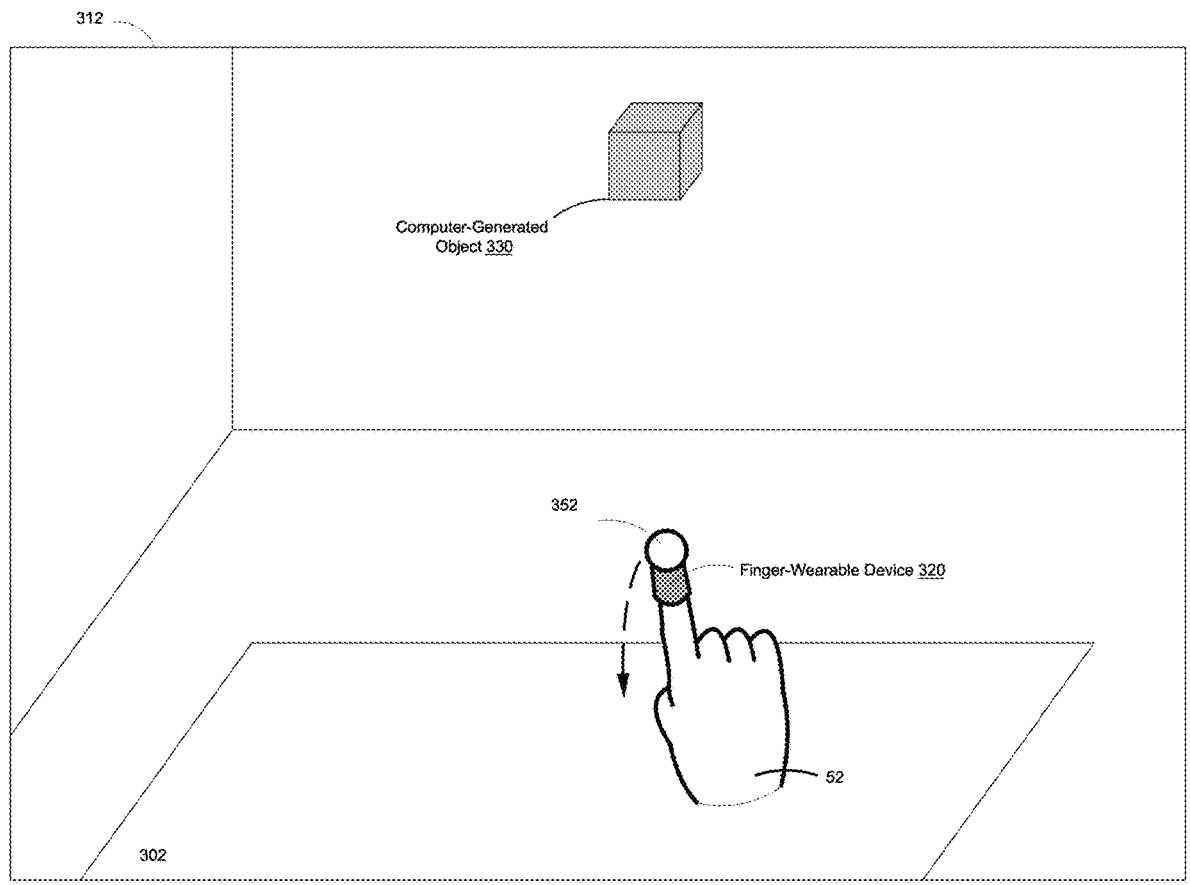
Figure 3J:
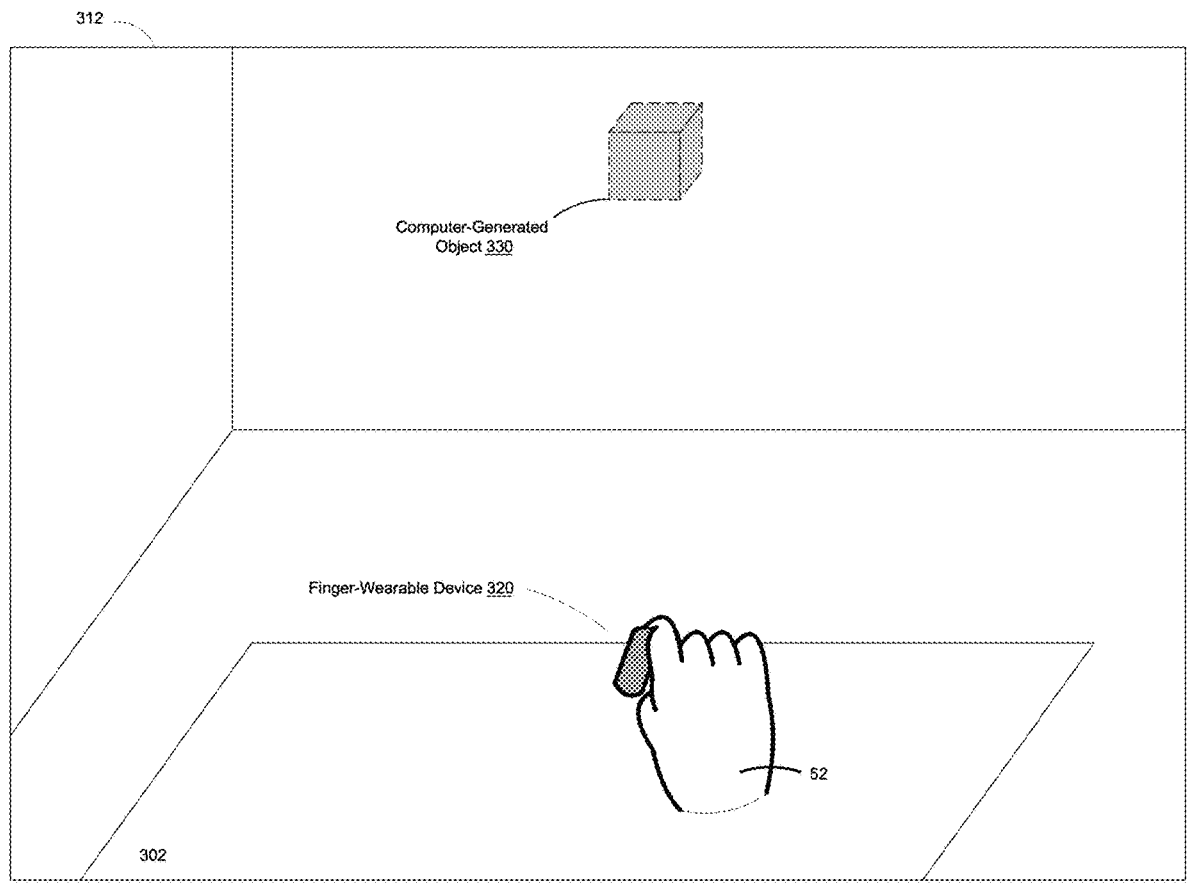

As illustrated in FIGS. 3I and 3J, the finger-wearable device 320, worn by the first hand 52 of the user 50, performs a tap gesture associated with a surface of the physical table 302. The tap gesture is indicated by a tap indicator 352 (illustrated for purely explanatory purposes). As the tap gesture proceeds, the electronic device 310 obtains finger manipulation data, such as contact intensity data. The contact intensity data may be indicative of a tap force of pressure associated with the tap gesture. For example, the finger-wearable device 320 senses (e.g., via a contact intensity sensor) deflection of a pad of a finger when the finger contacts the surface of the physical table 302. Accordingly, various implementations disclosed herein enable the user 50 to feel a physical surface (and the texture of the physical surface) with which the user 50 is interacting. In some implementations, the electronic device 310 uses IMU data in order to predict a touch between a finger (wearing the finger-wearable device 320) and the surface of the physical table 302, and uses interferometer data to detect the actual touch between the finger and the surface based on deflection. Based on detecting the tap gesture, the electronic device 310 selects the computer-generated object 330, as illustrated in FIG. 3J.

Figure 3K:
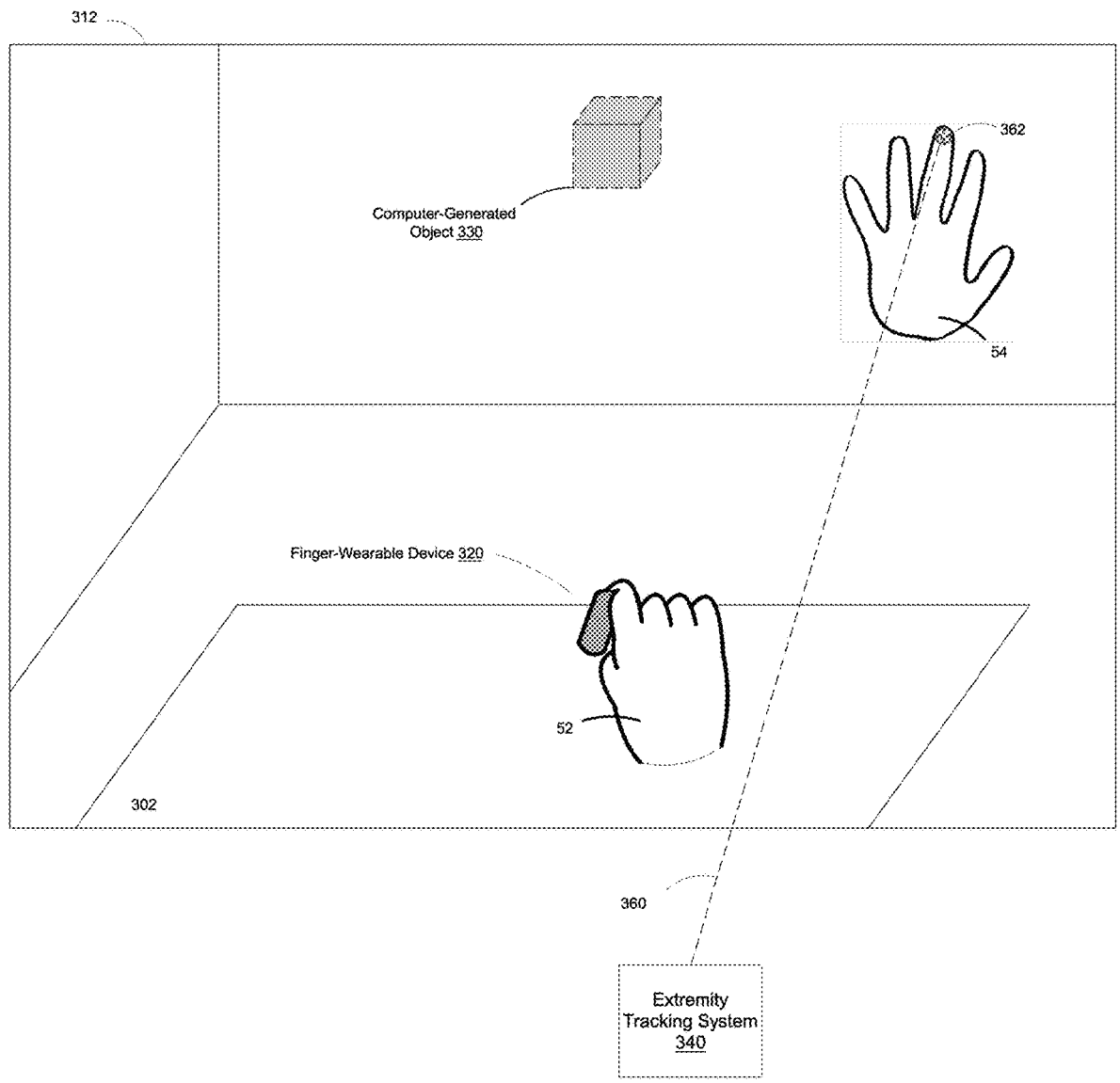

As illustrated in FIG. 3K, after selection of the computer-generated object 330, the second hand 54 of the user 50 moves to within the display 312. The electronic device 310 obtains extremity tracking data associated with the second hand 54 via the extremity tracking system 340. Reception of the extremity tracking data is indicated by a tracking line 360 (illustrated for purely explanatory purposes). The extremity tracking data indicates positional values associated with the middle finger of the second hand 54, as indicated by a reticle 362 (illustrated for purely explanatory purposes). One of ordinary skill in the art will appreciate that, in some implementations, extremity tracking data is indicative of a different finger of the second hand 54, multiple fingers of the second hand 54, or a different portion of the second hand 54 (e.g., the palm of the second hand 54).

Figure 3L:
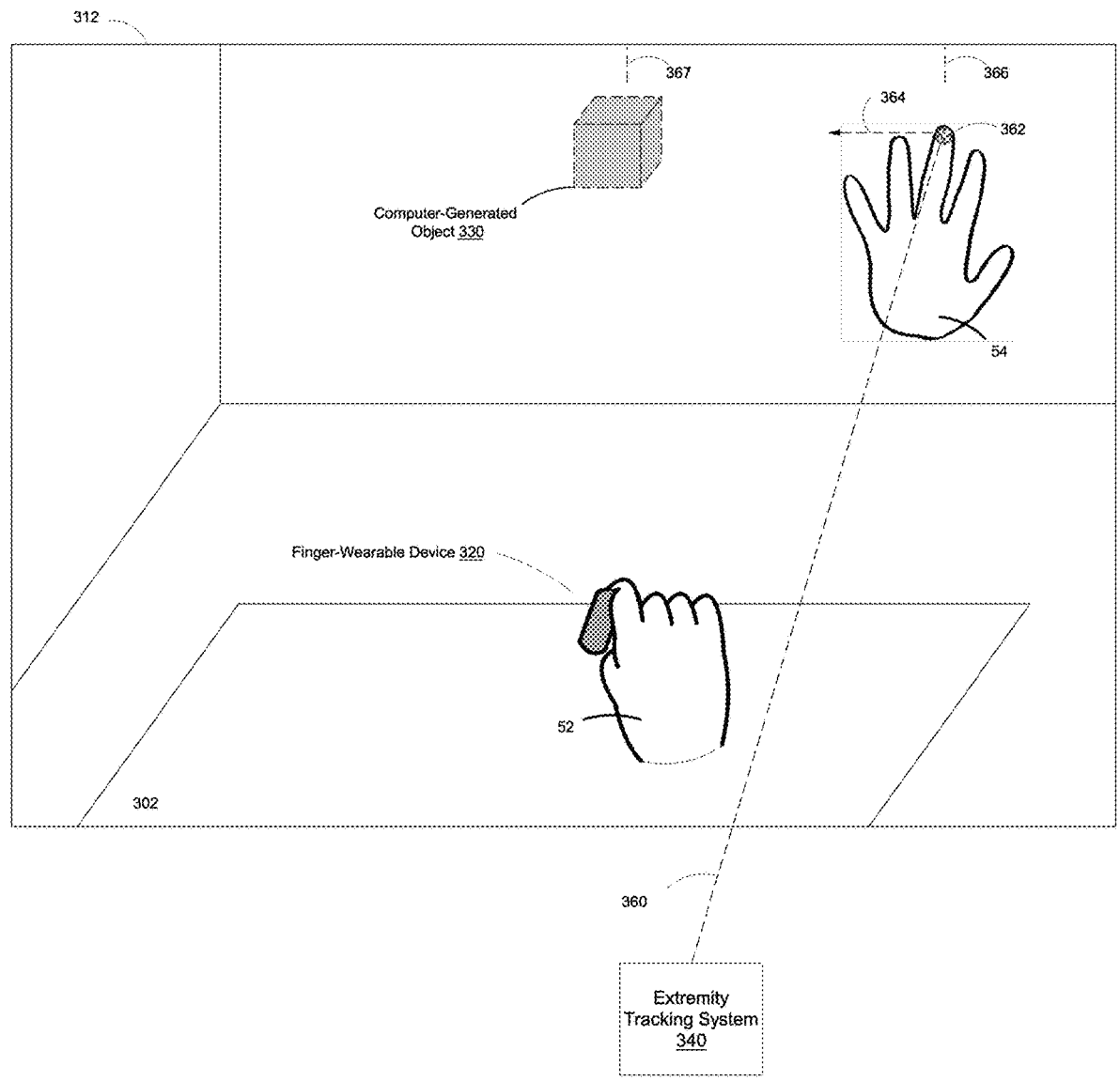

As illustrated in FIG. 3L, the middle finger of the second hand 54 begins a leftwards movement gesture from a first position to a third position. The leftwards movement gesture is indicated by a movement line 364 (illustrated for purely explanatory purposes). The first position is indicated by a first positional line 366 in FIG. 3L (illustrated for purely explanatory purposes). Moreover, before the leftwards movement of the middle finger, the computer-generated object 330) is located a second position. The second position is indicated by a second positional line 367 in FIG. 3L (illustrated for purely explanatory purposes).

Figure 3M:
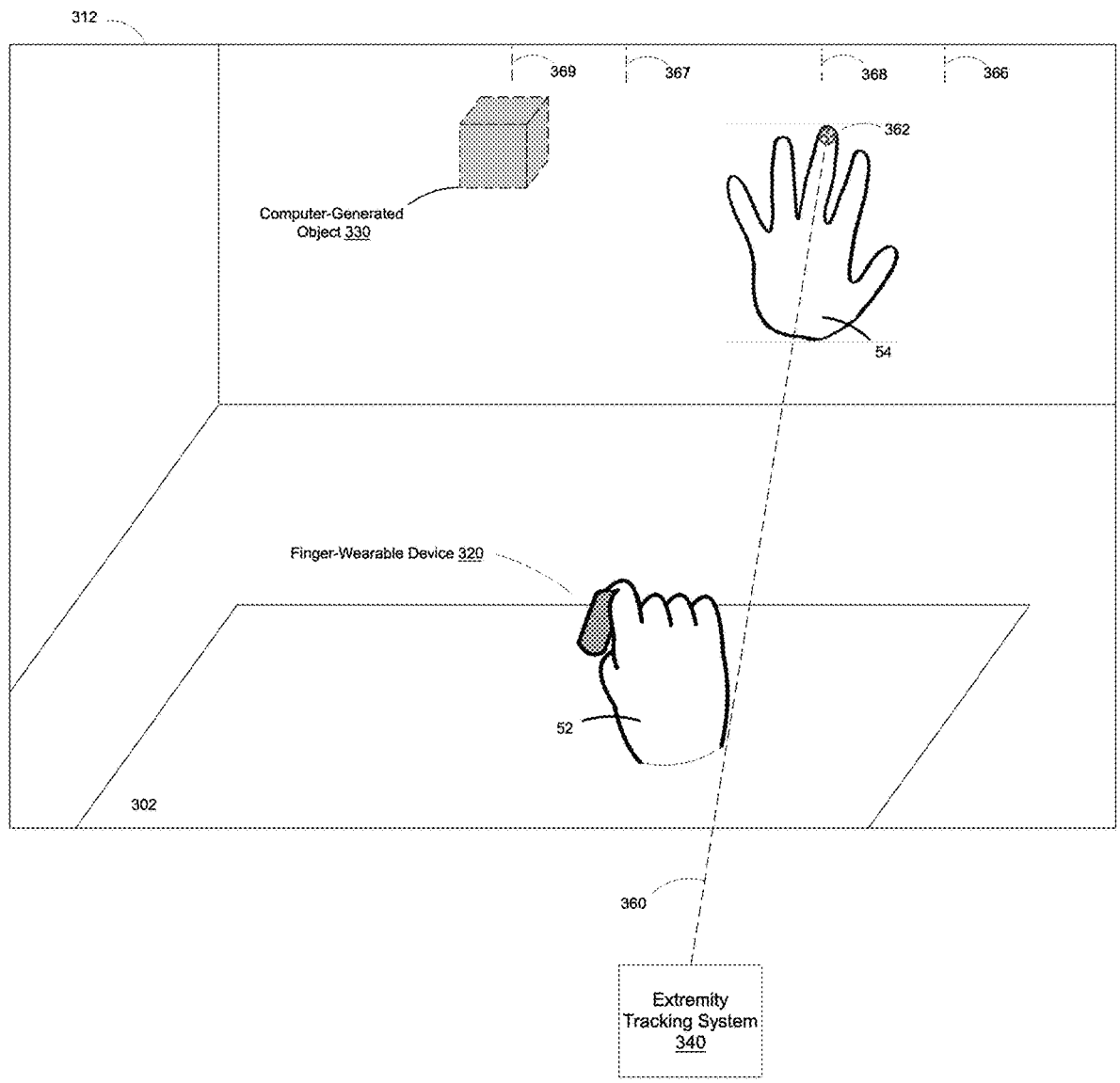

As the middle finger moves leftwards, the extremity tracking data indicates changing positional values associated with the middle finger. After performing the leftwards movement gesture, the middle finger is positioned at the third position, which is indicated in FIG. 3M by a third positional line 368 (illustrated for purely explanatory purposes). Based on the extremity tracking data, the electronic device 310 correspondingly moves the selected computer-generated object 330 leftwards, from the second position to a fourth position. The fourth position is indicated by a fourth positional line 369 in FIG. 3M (illustrated for purely explanatory purposes).

In some implementations, extremity tracking data is indicative of more than one finger of the second hand 54 as the second hand 54 performs the leftwards movement gesture. For example, the extremity tracking data indicates respective positional values associated with the middle finger and the index finger of the second hand 54. Accordingly, the electronic device 310 may register an engagement event with respect to the computer-generated object 330, based on the finger manipulation data and multi-fingered extremity tracking data.

Thus, with reference to FIGS. 3I-3M, based on the finger manipulation data (indicative of the tap gesture) and the extremity tracking data (indicative of the leftwards movement gesture), the electronic device 310 determines a multi-finger gesture. The multi-finger gesture includes a first portion corresponding to the tap gesture associated with the first hand 52, and a second portion corresponding to the leftwards movement gesture associated with the second hand 54. In some implementations, portions of a multi-finger gesture satisfy a sequential criterion with respect to each other. For example, with reference to FIGS. 3I-3M, the electronic device 310 detects the tap gesture more a threshold amount of time before detecting the leftwards movement gesture.

Figure 4:
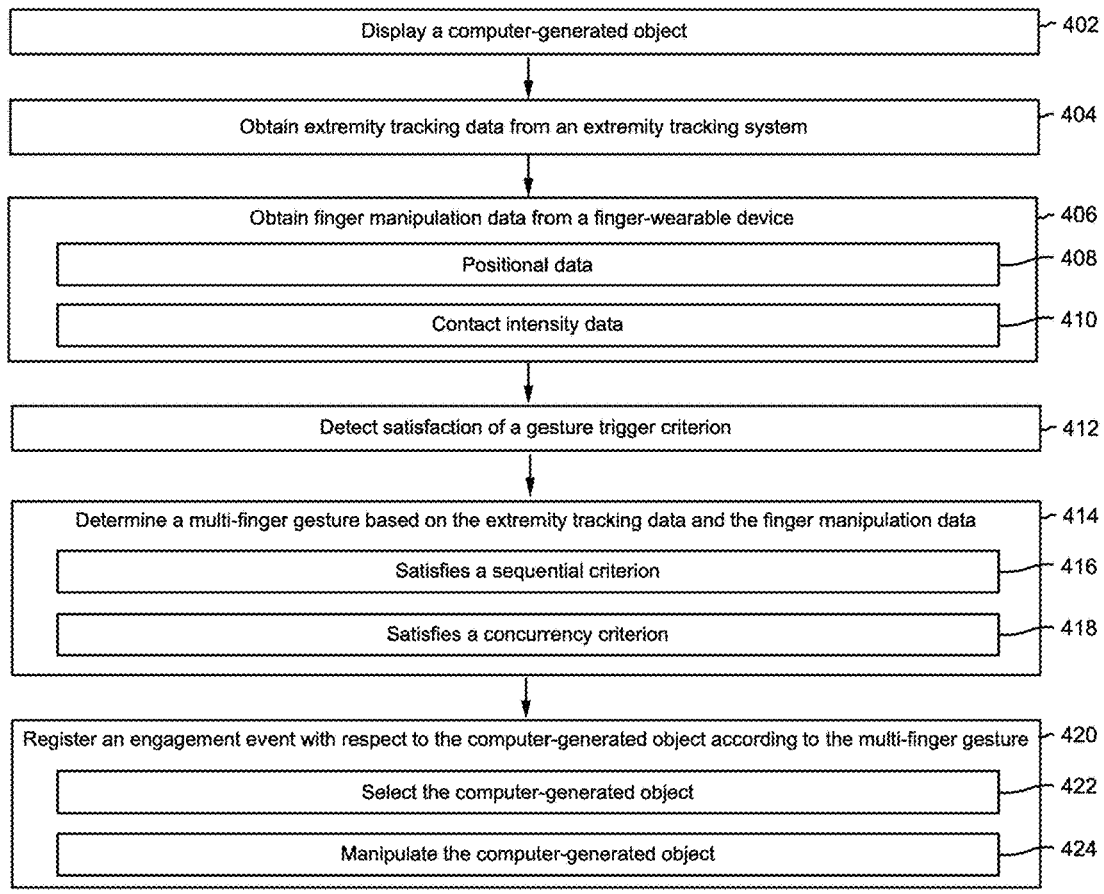
FIG. 4 is an example of a flow diagram of a method of registering an engagement event with respect to a computer-generated object based on a multi-finger gesture in accordance with some implementations.

FIG. 4 is an example of a flow diagram of a method 400 of registering an engagement event with respect to a computer-generated object based on a multi-finger gesture in accordance with some implementations. In various implementations, the method 400 or portions thereof are performed by an electronic device (e.g., the electronic device 100) in FIG. 1 or the electronic device 310 in FIGS. 3A-3M). In various implementations, the method 400 or portions thereof are performed by a head-mountable device (HMD). In some implementations, the method 400 is performed by processing logic, including hardware, firmware, software, or a combination thereof. In some implementations, the method 400 is performed by a processor executing code stored in a non-transitory computer-readable medium (e.g., a memory). In various implementations, some operations in method 400 are, optionally, combined and/or the order of some operations is, optionally, changed.

As represented by block 402, the method 400 includes displaying a computer-generated object, such as a 2D object or a 3D object. For example, with reference to FIG. 3B, the electronic device 310 displays, on the display 312, the computer-generated object 330, which corresponds to a 3D cube.

As represented by block 404, while displaying the computer-generated object, the method 400 includes obtaining extremity tracking data from an extremity tracking system. In some implementations, the extremity tracking system performs a computer-vision technique in order to generate the extremity tracking data. For example, the extremity tracking system semantically identifies one or more extremities within image data, and generates extremity tracking data indicative of respective positions of the one or more extremities within the image data. In some implementations, the extremity tracking data indicates a plurality of positional values associated with an extremity. To that end, in some implementations, the method 400 includes identifying, at a plurality of times, an extremity within image data, and determining the plurality of positional values based on the identification. The plurality of positional values is respectively associated with the plurality of times.

As represented by block 406, while displaying the computer-generated object, the method 400 includes obtaining finger manipulation data from a finger-wearable device via a communication interface. For example, as described with reference to FIGS. 3A-3M, the electronic device 310 obtains various types of finger manipulation data from the finger-wearable device 320. The finger manipulation data may indicate positional information (e.g., six degrees of freedom information) and contact intensity information (e.g., force or pressure information) associated with the finger-wearable device. In some implementations, the finger manipulation data is indicative of a gesture performed by the finger-wearable device.

According to various implementations, the finger manipulation data corresponds to sensor data associated with one or more sensors integrated in the finger-wearable device. For example, as represented by block 408, the sensor data includes positional data output from one or more positional sensors integrated in the finger-wearable device. As one example, the positional data is indicative of a rotational movement (e.g., IMU data) and/or a translational movement (e.g., magnetic sensor data) of the finger-wearable device, such as is illustrated in FIGS. 3G and 3H. In some implementations, the magnetic sensor data is output by a magnetic sensor that is integrated within the finger-wearable device, wherein the magnetic sensor senses weak magnetic fields.

As another example, as represented by block 410, the sensor data includes contact intensity data output from a contact intensity sensor integrated in the finger-wearable device. For example, with reference to FIGS. 3I and 3J, the electronic device 310 obtains contact intensity data from the finger-wearable device 320. Continuing with this example, the finger-wearable device 320 generates the contact intensity data based on a finger of the first hand 52 (wearing the finger-wearable device 320) tapping on the surface of the physical table 302. To that end, the finger-wearable device may sense (e.g., via the contact intensity sensor) deflection of a pad of a finger when the finger contacts the physical surface. Accordingly, various implementations disclosed herein enable a user to feel a physical surface (and the texture of the physical surface) with which the user is interacting. As another example, the contact intensity data includes interferometer data that is indicative of tap pressure associated with a gesture that is performed by the finger-wearable device. The interferometer data may be from an interferometer that is integrated within the finger-wearable device. The interferometer data may indicate a pressure level associated with a finger, wearing the finger-wearable device, contacting a physical object. As another example, in some implementations, the sensor data includes a combination of the positional data and the contact intensity data.

In some implementations, while obtaining the finger manipulation data, the finger-wearable device is not viewable on the display. For example, a user's hand, which includes a finger wearing the finger-wearable device, rests on the edge of a couch. Continuing with this example, based on the finger tapping, an electronic device obtains contact intensity data indicative of the tap. Resting a user's hand on a physical object enables a more comfortable user experience, resulting in potentially fewer erroneous (e.g., unintended) gestures performed by the finger-wearable device and thus less processor and communication link resource utilization by the electronic device.

As represented by block 412, in some implementations, the method 400 includes detecting satisfaction of a gesture trigger criterion. In some implementations, detecting the satisfaction of the trigger criterion includes determining that one of the extremity tracking data or the finger manipulation data is indicative of a particular gesture type (e.g., a tap gesture or a double tap gesture). For example, detecting the satisfaction of the trigger criterion includes determining that contact intensity data from a finger-wearable device indicates a tap gesture on a physical surface. In some implementations, detecting the satisfaction of the trigger criterion includes determining that audio input (e.g., a user's voice detected by an integrated microphone) is indicative of a request to start registering a multi-finger gesture. To that end, in some implementations, an electronic device includes a voice detection system (e.g., natural language processing (NLP) system) that generates semantic values associated with audio input, such as a semantic value of "begin the gesture."

As represented by block 414, the method 400 includes determining a multi-finger gesture based on extremity tracking data from the extremity tracking system and the finger manipulation data. In some implementations, determining the multi-finger gesture is based in part on a plurality of positional values, as indicated by extremity tracking data described with reference to block 404. In some implementations, determining the multi-finger gesture is in response to detecting the satisfaction of the gesture trigger criterion, as described with reference to block 412.

In some implementations, determining the multi-finger gesture includes determining a first gesture based on the extremity tracking data, and determining a second gesture based on the finger manipulation data. The first gesture corresponds to a first portion of the multi-finger gesture, and the second gesture corresponds to a second portion of the multi-finger gesture that is different from the first portion of the multi-finger gesture. For example, with reference to FIGS. 3C-3E, the electronic device 310 determines a first portion of a multi-finger pinch gesture based on the extremity tracking data, and determines a second portion of the multi-finger pinch gesture based on the finger manipulation data. Accordingly, in some implementations, the multi-finger gesture corresponds to a single-handed gesture (e.g., the first hand 52 in FIGS. 3C-3E). As another example, with reference to FIGS. 3I-3M, the electronic device 310 determines a first portion of a multi-finger gesture corresponding to a tap associated with the finger-wearable device 320 worn by the first hand 52, and determines a second portion of the multi-finger gesture corresponding to the leftwards movement associated with the second hand 54. Accordingly, in some implementations, the multi-finger gesture corresponds to a multi-handed gesture (e.g., the first hand 52 and the second hand 54 in FIGS. 3I-3M).

In some implementations, the method 400 includes determining that the multi-finger gesture corresponds to the multi-finger pinch gesture. To that end, the method 400 includes determining that the extremity tracking data is indicative of movement from a first position to a second position, determining that the finger manipulation data is indicative of movement from a third position to a fourth position, and determining that the second position satisfies a proximity threshold with respect to the fourth position. For example, the method 400 includes obtaining finger manipulation data from a finger-wearable device worn on user's index finger, and obtaining extremity tracking data associated with a user's thumb. Continuing with this example, the method 400 includes detecting a multi-finger pinch gesture in response to determining that the finger manipulation data and the extremity tracking data together indicate that the user's thumb and index finger move less than a threshold distance from each other.

As represented by block 416, in some implementations, a first portion of a multi-finger gesture satisfies a sequential criterion with respect to a second portion of the multi-finger gesture. For example, determining a second portion of a multi-finger gesture occurs more than a threshold amount of time after determining a first portion of the multi-finger gesture. As one example, with reference to FIGS. 3I-3M, the electronic device 310 begins determining the leftwards movement gesture associated with the second hand 54 more than a threshold amount of time (e.g., two seconds) after determining the tap gesture associated with the finger-wearable device 320.

As represented by block 418, in some implementations, a first portion of a multi-finger gesture satisfies a concurrency criterion with respect to a second portion of the multi-finger gesture. For example, determining a second portion of a multi-finger gesture occurs less than a threshold amount of time after determining a first portion of the multi-finger gesture. As one example, with reference to FIGS. 3C-3E, the electronic device 310 determines the first and second portions of the multi-finger pinch gesture (respectively associated with the extremity tracking data and the finger manipulation data) within a threshold amount of time of each other.

As represented by block 420, the method 400 includes registering an engagement event with respect to the computer-generated object according to the multi-finger gesture. The engagement event may include a variety of different types of engagement with the computer-generated object.

For example, as represented by block 422, registering the engagement event includes selecting the computer-generated object. As one example, selecting the computer-generated object includes determining that the multi-finger gesture corresponds to a multi-finger pinch gesture, such as is described with reference to FIGS. 3B-3F. In some implementations, the method 400 includes determining a respective location associated with a multi-finger gesture, wherein selecting the computer-generated object includes determining that the respective location satisfies a proximity threshold with respect to the computer-generated object.

As another example, as represented by block 424, registering the engagement event includes manipulating the computer-generated object. Manipulating the computer-generated object may include one or more of moving, rotating, duplicating, resizing, changing color/brightness, translating (e.g., along an axis), ceasing to display, etc. the computer-generated object. For example, with reference to FIGS. 3I-3M, the electronic device 310 moves a selected computer-generated object 330 leftwards based on finger manipulation data (indicating selection of the computer-generated object 330)) and extremity tracking data (indicating a leftwards movement of the middle finger of the second hand 54).

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
   at an electronic device with one or more processors, a non-transitory memory, an extremity tracking system, a display, and a communication interface provided to communicate with a finger-wearable device:
while displaying a computer-generated object on the display:
obtaining finger manipulation data from the finger-wearable device via the communication interface, wherein the finger manipulation data indicates a respective movement path of a first finger from a first position of an extended reality (ER) environment to a second position of the ER environment during a first time period;
generating, via the extremity tracking system, extremity tracking data by performing computer vision, wherein performing the computer vision includes determining a respective movement path of a second finger across a plurality of images, wherein the respective movement path of the second finger is from a third position of the ER environment to a fourth position of the ER environment during a second time period, and wherein the respective movement path of the first finger is different from the respective movement path of the second finger and the first time period is at least partially overlapping with the second time period;
determining a multi-finger gesture based on the extremity tracking data from the extremity tracking system and the finger manipulation data, wherein determining the multi-finger gesture is based on the respective movement path of the first finger and the respective movement path of the second finger; and
registering an engagement event with respect to the computer-generated object according to the multi-finger gesture.

2. The method of claim 1, wherein determining the multi-finger gesture includes:
determining a first gesture based on the extremity tracking data, wherein the first gesture corresponds to a first portion of the multi-finger gesture; and
determining a second gesture based on the finger manipulation data, wherein the second gesture corresponds to a second portion of the multi-finger gesture that is different from the first portion of the multi-finger gesture.

3. The method of claim 2, wherein the first portion of the multi-finger gesture satisfies a sequential criterion with respect to the second portion of the multi-finger gesture.

4. The method of claim 2, wherein the first portion of the multi-finger gesture satisfies a concurrency criterion with respect to the second portion of the multi-finger gesture.

5. The method of claim 1, wherein the extremity tracking data indicates a plurality of positional values respectively associated with the plurality of images, wherein determining the multi-finger gesture is based in part on the plurality of positional values, and wherein generating the extremity tracking data is independent of the finger manipulation data.

6. The method of claim 5, further comprising:
identifying, at a plurality of times, the second finger within the plurality of images; and
determining the plurality of positional values based on the identification, wherein the plurality of positional values is respectively associated with the plurality of times.

7. The method of claim 1, wherein the extremity tracking data is associated with a first hand, wherein the finger-wearable device is associated with a second hand that is different from the first hand, and wherein the multi-finger gesture corresponds to a multi-handed gesture.

8. The method of claim 1, wherein the extremity tracking data is associated with a first hand, wherein the finger-wearable device is also associated with the first hand, and wherein the multi-finger gesture corresponds to a single-handed gesture.

9. The method of claim 1, wherein registering the engagement event includes selecting the computer-generated object.

10. The method of claim 9, wherein selecting the computer-generated object includes determining that the multi-finger gesture corresponds to a pinch gesture.

11. The method of claim 10, wherein determining that the multi-finger gesture corresponds to the pinch gesture includes:
determining that the extremity tracking data is indicative of movement from a first position to a second position;
determining that the finger manipulation data is indicative of movement from a third position to a fourth position; and
determining that the second position satisfies a proximity threshold with respect to the fourth position.

12. The method of claim 9, further comprising determining a respective location associated with the multi-finger gesture, wherein selecting the computer-generated object includes determining that the respective location satisfies a proximity threshold with respect to the computer-generated object.

13. The method of claim 1, wherein registering the engagement event includes manipulating the computer-generated object.

14. The method of claim 1, wherein, while obtaining the finger manipulation data, the finger-wearable device is not viewable on the display.

15. The method of claim 1, further comprising detecting satisfaction of a gesture trigger criterion, wherein determining the multi-finger gesture is in response to detecting the satisfaction of the gesture trigger criterion.

16. The method of claim 15, wherein detecting the satisfaction of the trigger criterion includes determining that one of the extremity tracking data or the finger manipulation data is indicative of a particular gesture type.

17. The method of claim 1, wherein the finger manipulation data corresponds to sensor data output from one or more sensors integrated within the finger-wearable device.

18. The method of claim 17, wherein the sensor data includes positional data output from one or more positional sensors integrated in the finger-wearable device.

19. The method of claim 1, wherein determining the multi-finger gesture includes comparing the respective movement path of the first finger against the respective movement path of the second finger.

20. The method of claim 1, wherein registering the engagement event includes moving the computer-generated object within the XR environment.

21. An electronic device comprising:
one or more processors;
a non-transitory memory;
a display;
an extremity tracking system;
a communication interface provided to communicate with a finger-wearable device; and
one or more programs, wherein the one or more programs are stored in the non-transitory memory and configured to be executed by the one or more processors, the one or more programs including instructions for:
while displaying a computer-generated object on the display:

obtaining finger manipulation data from the finger-wearable device via the communication interface, wherein the finger manipulation data indicates a respective movement path of a first from a first position of an extended reality (ER) environment to a second position of the ER environment over a first time period;

generating, via the extremity tracking system, extremity tracking data by performing computer vision, wherein performing the computer vision includes determining a respective movement path of a second finger across a plurality of images, wherein the respective movement path of the second extremity is from a third position of the ER environment to a fourth position of the ER environment over a second time period, and wherein the respective movement path of the first finger is different from the respective movement path of the second finger and the first time period and the second time period are at least partially overlapping;

determining a multi-finger gesture based on the extremity tracking data from the extremity tracking system and the finger manipulation data, wherein determining the multi-finger gesture is based on the respective movement path of the first finger and the respective movement path of the second finger; and registering an engagement event with respect to the computer-generated object according to the multi-finger gesture.

22. A non-transitory computer readable storage medium storing one or more programs, the one or more programs comprising instructions, which, when executed by an electronic device with one or more processors, a display, an extremity tracking system, and a communication interface provided to communicate with a finger-wearable device, cause the electronic device to:

while displaying a computer-generated object on the display:

obtain finger manipulation data from the finger-wearable device via the communication interface, wherein the finger manipulation data indicates a respective movement path of a first finger from a first position of an extended reality (ER) environment to a second position of the ER environment over a first time period;

generate, via the extremity tracking system, extremity tracking data by performing computer vision, wherein performing the computer vision includes determining a respective movement path of a second finger across a plurality of images, wherein the respective movement path of the second finger is from a third position of the ER environment to a fourth position of the ER environment over a second time period, and wherein the respective movement path of the first finger is different from the respective movement path of the second finger and the first time period and the second time period are at least partially overlapping;

determine a multi-finger gesture based on the extremity tracking data from the extremity tracking system and the finger manipulation data, wherein determining the multi-finger gesture is based on the respective movement path of the first finger and the respective movement path of the second finger; and register an engagement event with respect to the computer-generated object according to the multi-finger gesture.

\* \* \* \* \*